(12) United States Patent
Khajepour et al.

(10) Patent No.: US 7,172,385 B2
(45) Date of Patent: Feb. 6, 2007

(54) LIGHT WEIGHT PARALLEL MANIPULATORS USING ACTIVE/PASSIVE CABLES

(76) Inventors: Amir Khajepour, 211 Haldane Court, Waterloo (CA) N2T 1T6; Saeed Behzadipour, 24 Brybeck, Apt. 101, Kitchener (CA) N2M 2C7; Robert Dekker, 13B Avondale St. South, Waterloo (CA) N2L 2C7; Edmon Chan, 73 Cairncross Crescent, Markham (CA) L3S 3Y1

( * ) Notice: Subject to any disclaimer, the term of this patent is extended or adjusted under 35 U.S.C. 154(b) by 234 days.

(21) Appl. No.: 10/615,595

(22) Filed: Jul. 9, 2003

(65) Prior Publication Data
US 2004/0146388 A1 Jul. 29, 2004

Related U.S. Application Data

(60) Provisional application No. 60/394,272, filed on Jul. 9, 2002.

(51) Int. Cl.
*B66C 1/00* (2006.01)

(52) U.S. Cl. ............... 414/735; 74/490.04; 74/490.06; 414/917; 901/21; 901/29

(58) Field of Classification Search ............... 414/735, 414/917; 901/21, 29; 74/490.04, 490.06
See application file for complete search history.

(56) References Cited

U.S. PATENT DOCUMENTS 3,286,851 A 11/1966 Sperg (Continued)

FOREIGN PATENT DOCUMENTS

JP 11 077577 6/1999

OTHER PUBLICATIONS

"Delta, a Fast Robot with Parallel Geometry", R. Clavel, Proc, Int. Symposium on Industrial robots, Apr. 1988, pp. 91-100.

(Continued)

*Primary Examiner*—Donald Underwood
(74) *Attorney, Agent, or Firm*—Lynn C. Schumacher; Hill & Schumacher

(57) ABSTRACT

The present invention provides parallel, cable based robotic manipulators, for use in different applications such as ultra high-speed robots or positioning devices with between three to six degrees of freedom. The manipulators provide more options for the number of degrees of freedom and also more simplicity compared to the current cable-based robots. The general structure of these manipulators includes a base platform, a moving platform or end effector, an extensible or telescoping central post connecting the base to moving platform to apply a pushing force to the platforms. The central post can apply the force by an actuator (active), or spring or air pressure (passive) using telescoping cylinders. The robotic manipulators use a combination of active and passive tensile (cable) members, and collapsible and rigid links to maximize the benefits of both pure cable and conventional parallel mechanisms. Different embodiments of the robotic manipulators use either active cables only, passive cables only, or combinations of active and passive cables. An active cable is one whose length is varied by means of a winch. A passive cable is one whose length is constant and which is used to provide a mechanical constraint. These mechanisms reduce the moving inertia significantly to enhance the operational speed of the robots. They also provide a simpler, more cost effective way to manufacture parallel mechanisms for use in robotic applications.

7 Claims, 25 Drawing Sheets

U.S. PATENT DOCUMENTS

| | | |
|---|---|---|
| 3,497,083 A | 2/1970 | Anderson |
| 3,631,737 A | 1/1972 | Wells |
| 4,666,362 A | 5/1987 | Landsberger et al. |
| 4,683,773 A | 8/1987 | Diamond |
| 4,976,582 A | 12/1990 | Clavel |
| 5,046,375 A * | 9/1991 | Salisbury et al. .......... 74/89.22 |
| 5,313,854 A | 5/1994 | Akeel |
| 5,333,514 A | 8/1994 | Toyama et al. |
| 5,967,729 A | 10/1999 | Foes |

OTHER PUBLICATIONS

"Kinematics of a Three-DOF Platform with Three Extensible Limbs", Lung-Wen Tsai, Recent Advances in Robot Kinematics, pp. 401-409.

"A Smart Kinestatic Interactive Platform", M. Griffis et al., Advances in Robot Kinematics and Computationed Geometry, pp. 459-464.

"Development of an Ultrahigh speed Robot FALCON using Wire Drive System", S. Kawamura et al., IEEE International Conference on Robotics and Automation 1995, pp. 215-220.

* cited by examiner

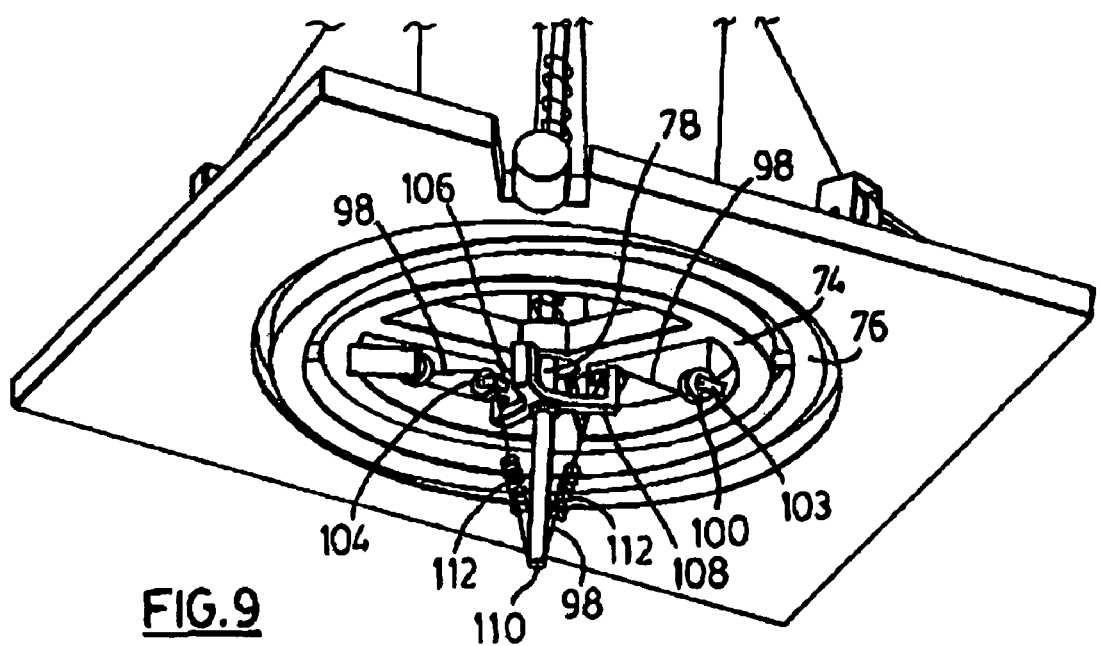

LIGHT WEIGHT PARALLEL MANIPULATORS USING ACTIVE/PASSIVE CABLES

CROSS REFERENCE TO RELATED APPLICATIONS

This patent application relates to, and claims the priority benefit from, U.S. Provisional Patent Application Ser. No. 60/394,272 filed on Jul. 9, 2002 and which is incorporated herein in its entirety.

FIELD OF THE INVENTION

This invention relates to robotic manipulators for moving and positioning an object in space, and more particularly the present invention relates to light weight cable actuated active/passive parallel manipulators.

BACKGROUND OF THE INVENTION

Robotic manipulators may be divided into two main categories, parallel and serial manipulators. Serial manipulators, which are more common in the industry, have several links in series usually connected by rotary or sliding joints. They are analogous to the human arm which has a series of links hinged at the shoulder, elbow and wrist. The configuration of serial manipulators necessitates the location of the driving motors to be at the joints themselves or the use of a heavy or complicated linkage for transferring the motion from the base of the robot to the joints. This is a disadvantage since it requires the movement of the large mass of the manipulator and drives even for a small payload. Further, the positional error of the end effector of a serial manipulator is the accumulation of the errors in the individual links so that by increasing the size or number of links the error associated with the position of the end effector increases.

In contrast to serial manipulators, the links of a parallel manipulator function in parallel to determine the movement of the end effector. A flight simulator and camera tripod are two examples of this kind of mechanisms. If one of the legs of a tripod is extended or moved, it changes the position of the end point. Parallel manipulators have relatively lower mass to payload ratio since the links work together and the actuators are mounted on a stationary base. They also have better precision since the error in the end effector is in the same order of actuators' error.

Low inertia, and therefore, high speed manipulation is one of the main applications of parallel robots. U.S. Pat. No. 4,976,5821 issued to Clavel, entitled 'Device for the Movement of and Positioning of an Element in Space', and reported further in Clavel, 'Delta, a Fast Robot with Parallel Geometry', Proceeding of International Symposium on Industrial Robots, pp. 91–100, Apr. 1988, discloses one of the most successful mechanisms of this kind which produces movement with three pure translational degrees of freedom at its end effector. In this manipulator of Clavel, rotating arms are connected to the end effector using three parallelograms. The parallelograms constrain the end effector to be parallel to the base plate at all times and therefore, three pure translational movements are achieved.

Other manipulator designs such as disclosed in L-W. Tsai, 'Kinematic of a Three-DOF Platform With Extensible Limbs', Proceeding of the Conference of Recent Advances in Robot Kinematics, pp. 401–410,1996, also provide pure translational movement of the end effector with three translational degrees of freedom. In the Tsai mechanism, three linear actuators connect the end effector to the stationary platform with universal joints. The specific configuration of the universal joints guarantees the three translational motions of the end effector.

There are also parallel mechanism robots with 6-DOF such as the hexa pod, see Griffis M., Crane C., et Duffy J., 'A smart kinestatic interactive platform', In *ARK*, pp. 459–464, Ljubljana, 4–6 July 1994, and the hexa robot disclosed in U.S. Pat. No. 5,333,514 issued to Toyama et al. entitled 'Parallel Robot'.

In general, parallel mechanism robots have higher stiffness to weight ratio, moment and torque capacity, and better accuracy. They also benefit from a simpler mechanism due to the elimination of drive trains and, also lower moving mass due to the stationary location of the actuators. Further reduction in the moving inertia of parallel mechanisms may be achieved by replacing the rigid links with tensile means such as cables. Replacing the rigid arms not only reduces the moving inertia but it lowers manufacturing cost and simplifies the mechanism structure by eliminating many joints.

Using cables in cranes such as disclosed in U.S. Pat. No. 3,286,851 issued to J. R. Sperg entitled 'Cargo Handling Rig', and similar applications, see U.S. Pat. No. 5,967,72910 issued to G. F. Foes entitled 'Bottom Discharge Rotating Ring Drive Silo Unloader', is older than robotics, however in recent years several attempts have been made to design cable actuated manipulators. Some of these manipulators are designed to imitate human arms and can be considered as serial manipulators with parallel actuators, see U.S. Pat. No. 3,631,737 issued to F. E. Wells entitled 'Remote Control Manipulator for Zero Gravity Environment'; U.S. Pat. No. 3,497,083 issued to V. C. Anderson, R. C. Horn entitled 'Tensor Arm Manipulator'; and U.S. Pat. No. 4,683,773 issued to G. Diamond entitled 'Robotic Device'.

A pure parallel cable actuated mechanism is disclosed in S. Kawamura, W. Choe, S. Tanaka, S. R. Pandian, 'Development of an ultrahigh Speed Robot FALCON using Wire Drive System', Proceeding of IEEE Conference on Robotics and Automation, pp. 215–220, 1995. This manipulator has seven active cables to provide 6-DOF for the end effector. This mechanism does not have any rigid link in its structure and the cables are extended in both sides to maintain tension in the cables.

U.S. Pat. No. 4,666,362 issued to S. E. Landsberger and T. B. Sheridan entitled 'Parallel Link Manipulator' discloses a manipulator which uses six active cables and a passive collapsible link. The collapsible link applies a pushing force between the moving and stationary platforms in order to keep all cables in tension.

U.S. Pat. No. 5,313,854 issued to H. A. Akeel entitled 'Light Weight Robot Mechanism', discloses another combined cable-collapsible mechanism which moves the end point of the collapsible shaft in the space but does not have any control on its orientation.

SUMMARY OF THE INVENTION

Based on the advantages of parallel and cable based manipulators, some new designs are introduced in this work which can be used in ultra high-speed robots with 3 to 6 degrees of freedom. The robotic mechanisms disclosed herein provide more options for the number of degrees of freedom and also more simplicity compared to the current cable-based robots. In the proposed designs a combination of active and passive tensile members, collapsible and rigid links are used to maximize the benefits of both pure cable and parallel mechanisms.

Applications of both passive and active cables in the new designs improve performance, simplicity and feasibility of the robots. An active cable is one whose length is varied by means of a rotating drum. A passive cable is one whose length is constant and which is used to provide a mechanical constraint. In general, compared to rigid link parallel mechanisms the robotic mechanisms disclosed herein advantageously reduce the moving inertia significantly to enhance the operational speed of the robots. They also provide a simpler, more cost effective way to manufacture parallel mechanisms for use in robotic applications, measurements, and entertainments.

The design of new light weight parallel manipulators for high-speed robots using active/passive cables is explained herebelow. The general structure of these manipulators has the following main components (see FIGS. 1 and 2):

a) A base platform 24.
b) A moving platform or end effector 22.
c) An extensible or telescoping central post 26 connecting the base 24 to moving platform 22 to apply a pushing force to the platforms. The central post can apply the force by an actuator (active) or spring or air pressure (passive); and
d) Active cables 28. Active cables are those whose lengths change using an actuator; and/or
e) Passive cables 42. Passive cables are cables whose lengths are fixed.

The robotic mechanism may have just active cables, just passive cables, or a combination of both.

In one aspect of the invention there is provided a robotic mechanism, comprising:

a support base, an end effector and a biasing member having opposed ends and attached at one of said opposed ends to the support base and attached at the other of said opposed ends to the end effector; and at least three cables each connected at a first end thereof to said end effector and said at least three cables having second ends being attached to an associated positioning mechanism for retracting or deploying each of said at least three cables to position said end effector in a selected position in space, said biasing member applying force on the end effector with respect to the support base for maintaining tension in said at least three cables.

The present invention also provides a robotic mechanism, comprising:

a support base, an end effector and a biasing member having opposed ends and pivotally attached at one of said opposed ends to the support base and pivotally attached at the other of said opposed ends to the end effector; and six cables each connected at a first end thereof to said end effector and said six cables having second ends being attached to an associated positioning mechanism for moving the second ends of the associated cable independently of the other cables, said biasing member applying force on the end effector with respect to the support base for maintaining tension in said six cables, wherein movement of the second ends of the cables by the associated positioning mechanisms changes a position and orientation of the end effector so that the robotic mechanism has six degrees of freedom.

The present invention also provides a five-degree-of-freedom robotic mechanism, comprising:

a support base, an end-effector and a biasing member having opposed ends and pivotally attached at one of said opposed ends to the support base with a universal joint and pivotally attached at the other of said opposed ends to the end-effector with a universal joint; and five cables each connected at a first end thereof to said end effector and said five cables having second ends being attached to an associated positioning mechanism for moving the second ends of the associated cable independently of the other cables, said biasing member applying force on the end effector with respect to the support base for maintaining tension in said five cables, wherein movement of the second ends of the cables by the associated positioning mechanisms changes a position and orientation of the end-effector.

The present invention also provides a robotic mechanism, comprising:

an end effector, a post having opposed ends being pivotally connected at one of said opposed ends to the end effector;

a support base defining a plane and having a hole extending therethrough, an outer ring structure pivotally connected to said support base within said hole for pivotal motion of said outer ring structure out of the plane of said support base, a first actuator for pivoting said outer ring structure, an inner ring structure pivotally mounted to said outer ring structure inside said outer ring structure, said inner ring structure being concentric with said outer ring structure, a second actuator for pivoting said inner ring structure, said inner ring structure having an axis of rotation in the plane of the outer ring, and perpendicular to the axis of rotation of said outer ring structure, said inner ring structure having a central web with a hole therethrough and a universal joint mounted in said hole to the central web, the other end of said post being slidably mounted in said universal joint, bias means connected to said post for biasing said end effector away from said support base;

a first set of three cables each connected at one end thereof to said end effector and the other ends of said first set of three cables being attached to positioning means mounted on said support base for pulling said three cables independently of each other to position said end effector in a selected position in space; and a second set of three cables each connected at one end thereof to said end effector and the other ends thereof being attached to the other end of said post, said second set of three cables being mounted to said inner ring at substantially 120° with respect to each other and constrained to be parallel to each other between said end effector and said inner ring and wherein when said positioning means moves said end effector to a selected position in its workspace, said second set of three cables maintains said end effector in a plane parallel to the plane of said inner ring.

The present invention also provides a robotic mechanism, comprising:

an end effector, a post having opposed ends being pivotally connected at one of said opposed ends to the end effector using a universal joint, the post having an adjustable length;

a support base defining a plane and having a hole extending therethrough, an outer ring structure pivotally connected to said support base within said hole for pivotal motion of said outer ring structure out of the plane of said support base, a first actuator for pivoting said outer ring structure, an inner ring structure pivotally mounted to said outer ring structure inside said outer ring structure, said inner ring structure being concentric with said outer ring structure, a second actuator for pivoting said inner ring structure, said inner ring structure having an axis of rotation in the plane of the outer ring, and perpendicular to the axis of rotation of said outer ring structure, said inner ring structure having a central web with a hole therethrough and a universal joint mounted in said hole to the central web, the other end of said post being slidably mounted in said universal joint,;

a first set of three cables each connected at one end thereof to said end effector and the other ends of said first set of three cables being attached to a positioning mechanism mounted on said support base for pulling said three cables independently of each other to position said end effector in a selected position in space; and a second set of three cables each connected at one end thereof to said end effector and the other ends thereof being attached to, a winch mounted on said central web of the inner ring assembly, said second set of three cables being guided through pulleys mounted to said inner ring at substantially 120° with respect to each other and constrained to be parallel to each other between said end effector and said inner ring, wherein the winch retracts or deploys all three cables simultaneously and keeps the cable lengths between the inner ring and the end-effector equal so that when said positioning mechanism moves said end effector to a selected position in its workspace, said second set of three cables maintains said end effector in a plane parallel to the plane of said inner ring.

The present invention also provides a robotic mechanism, comprising:

an end effector, a post having opposed ends and an adjustable length being pivotally connected at one of said opposed ends to the end effector;

a support base, the other end of said opposed ends of the post being pivotally connected on a top surface of said support base;

a set of three cables each connected at one end thereof to the end of said post pivotally connected to said end effector and the other ends of each of said first set of three cables being attached to positioning means mounted on said support base for pulling said cables to position said end effector in a selected position in space;

a first longitudinal shaft having a first longitudinal axis and a pulley being rigidly mounted on each end of said first shaft, said first longitudinal shaft being mounted on a bottom surface of said support base and parallel to said support base, the first longitudinal shaft is passing through a first sleeve, a first rotational spring mounted from one end to the first sleeve and from the other end to the first longitudinal shaft for applying a constant torque to the fist longitudinal shaft, including a first motor connected to said first longitudinal shaft for rotating said first longitudinal shaft about an axis parallel to the said support base and normal to said first longitudinal shaft, a second longitudinal shaft having a second longitudinal axis and a pulley rigidly mounted on each end of said second shaft, said second longitudinal shaft being mounted on the bottom surface of said support base and parallel thereto and oriented so said first longitudinal axis is perpendicular to said second longitudinal axis, the second longitudinal shaft is passing through a second sleeve, a second rotational spring mounted from one end to the sleeve and from the other end to the second longitudinal shaft applies a constant torque to the second longitudinal shaft, including a second motor connected to said second longitudinal shaft for rotating said second longitudinal shaft about an axis parallel to the said support base and normal to said second longitudinal shaft; and a first pair of cables with each cable connected at one end thereof to said end effector and the other end of one of the cables being collected by one of the pulleys at the end of the first longitudinal shaft and the other end of the other cable being collected by the other pulley at the other end of the first longitudinal shaft, the first rotational spring mounted in the first sleeve 148 which applies torque to the first longitudinal shaft has both the pulleys rotate and collect the first pair of cables so that the lengths of the cables of the said first pair of cables remain the same and therefore a parallelogram is maintained by the first pair of cables, a second pair of cables with each cable connected at one end thereof to said end effector and the other end of one of the cables being collected by one of the pulleys at the end of the second longitudinal shaft and the other end of the other cable being collected or deployed by the other pulley at the other end of the second longitudinal shaft as said second longitudinal shaft is rotated by the torque provided by the rotational spring mounted in the second sleeve 146 and therefore the length of the cables of said second pair of cables remains the same and thus a parallelogram is maintained by the second pair of cables, and wherein said cables of said first pair of cables are parallel and said cables of the second pair of cables are parallel so that a plane defined by said end effector is maintained parallel to a plane defined by said two longitudinal shafts.

BRIEF DESCRIPTION OF THE DRAWINGS

The present invention will now be described by way of example only, reference being had to the accompanying drawings in which:

FIG. 9 is a perspective view showing the connection of passive cables to the bottom end of the center post;

DETAILED DESCRIPTION OF THE INVENTION

1. Three-degree-of-freedom Parallel Mechanism using Active Cables

Figure 1:
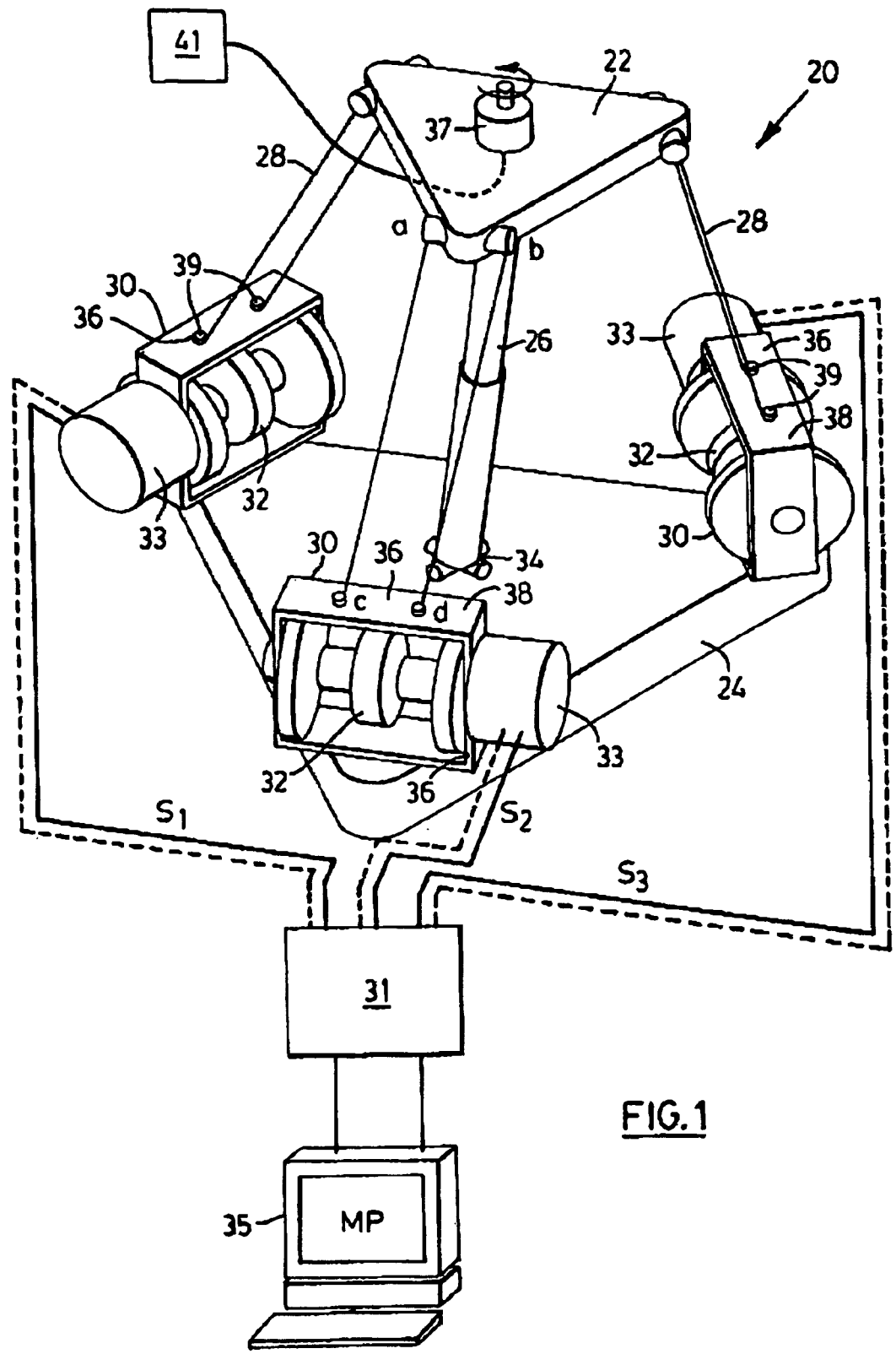
FIG. 1 is a perspective view of a three degree of freedom (DOF) wire actuated parallel robot using active cables constructed in accordance with the present invention.

A three-degree-of-freedom parallel robotic mechanism using active cables constructed in accordance with the present invention is shown generally at 20 in FIG. 1 and includes a moving platform 22 that is attached to base platform 24 using an extensible or telescoping central post 26 and three sets of parallel cables 28 with one end of each of cable attached to platform 22 and the other ends of each pair of cables attached to an associated winch assembly 30. Each winch assembly 30 includes a drum 32 mounted for rotation in a frame 36 which is attached to the base 24 to keep the drum 32 in place and also to guide the cables 28 to the drum via two holes 39 located in the top plate 38 of the frame 36. The extensible post 26 is attached to the platform 22 (end-effector) and base 24 by universal joints 34 at both ends of the post to prevent the rotation of the moving platform 22. The extensible center post 26 applies a compression force between the platforms 22 and 24 using a linear actuator such as a hydraulically, pneumatically, and electrically powered cylinder. Alternatively, a linear motor (active element) or using a preloaded spring, or air pressure (passive element) may be employed in alternative embodiments of the mechanism to maintain tension of cables 28. Post 26 may be any one of a hydraulically, pneumatically, and electrically powered cylinder.

The motion of the moving platform 22 is controlled by the three pairs of active cables 28. The two cables of each pair of cables 28 are parallel to each other to make a parallelogram as shown by the closed loop of a-b-c-d in FIG. 1. A motor controller 31 is connected to the motors 33 for driving the motors as well as being connected to position/velocity sensors on each of the drums 32. A computer 35 attached to the controller 31 is used to program/command the controller for positioning the cables on each of the winches. A tool 37 is mounted on top of end effector 22 and is controlled by controller 31 or by separate controller 41. When the end effector 22 is to be positioned in a selected location in its workspace, signals are sent by controller 31 based on its existing program or command signals sent by computer 35 which in turn moves the drums 32 in each winch 30 to either roll up the parallel cables 28 or release them, depending on the particular winch and where in the robotic workspace space the end effector 22 is to be located. The lengths of the three pairs of the cables 28 are adjusted independently to provide three degrees of freedom to the end effector platform 22.

Due to the three cable-parallelogram structures the moving platform 22 will always be parallel to the base platform 24 and can undergo three translational degrees of motion. This is obtained because the edge a-b in parallelogram a-b-c-d (similarly in the other two parallelograms) is always parallel to edge c-d that is parallel to base platform 24. Since the three intersecting edges (a-b and the other two similar edges) are always parallel to base platform 24, the moving platform 22 remains parallel to base platform 24 regardless of the lengths of the pairs of cables 28. The lengths of each pair of cables 28 are controlled independently by their associated rotating drums 32. The lengths of each pair of cables 28 determines the center location of the moving platform 22 while the parallelograms keep the platform 22 parallel to the base 24. The length of the central post 26 changes according to the location of the moving platform 22 and the compression force that is applied to the platform 22 from the central post 26.

2. Three-degree-of-freedom Parallel Mechanism using Passive Cables

Figure 2:
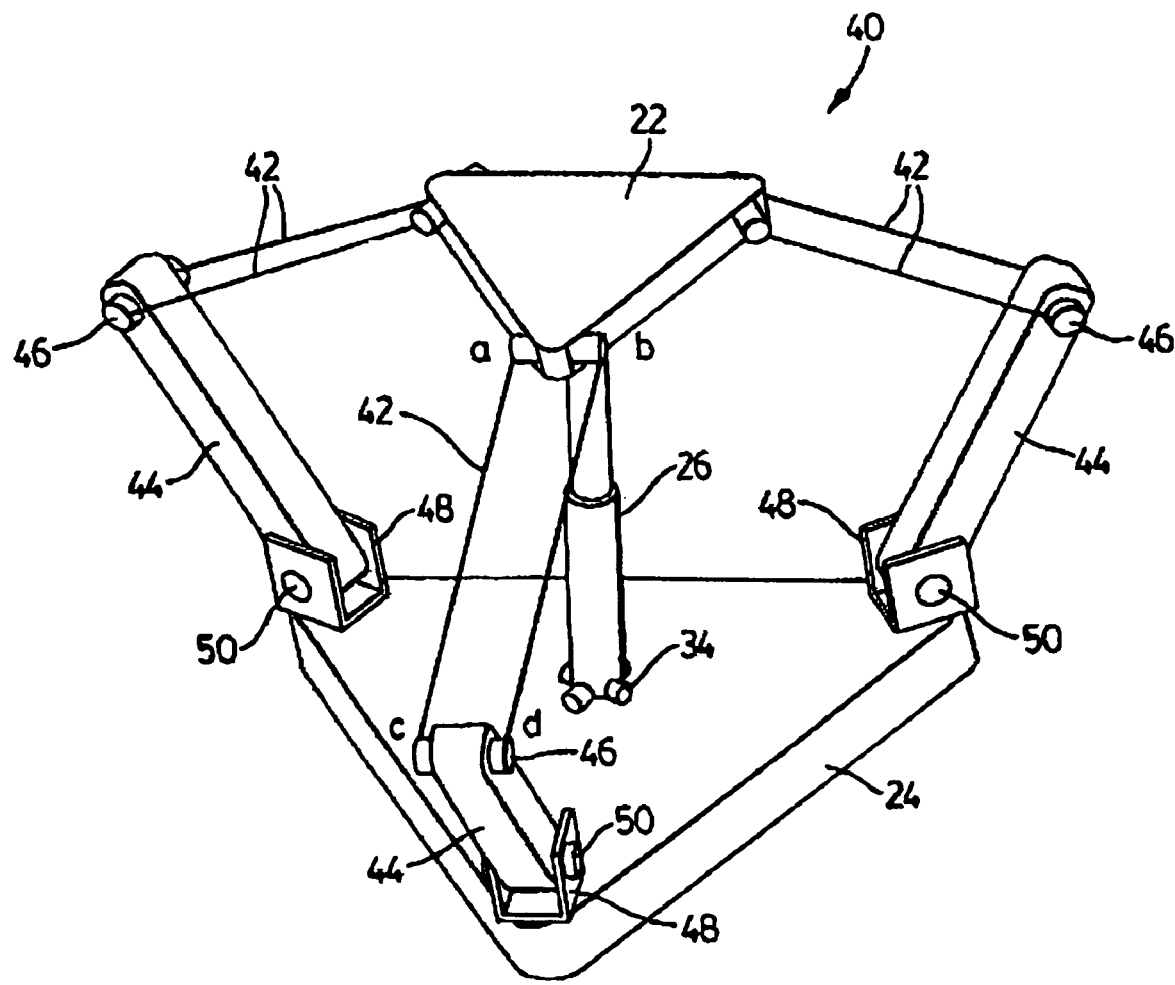
FIG. 2 is a perspective view of a three degree of freedom wire actuated parallel robot using passive cables.

A three-degree-of-freedom parallel robotic mechanism using passive cables constructed in accordance with the present invention is shown generally at 40 in FIG. 2 and includes moving platform 22 that is attached to base platform 24 using an extensible or telescoping central post 26. As with robot 20 in FIG. 1, the extensible post 26 is attached to the platforms 22 and 24 by universal joints 34 at both ends of the post to prevent the rotation of the moving platform 22. There are three pairs of fixed-length cables 42 attached to the moving platform 22 and each pair of cables 42 forms a parallelogram a-b-c-d as seen in FIG. 2. The ends of each pair of cables 42 at the lower edge c-d of the parallelogram are connected to a link arm 44 using a revolute joint 46 having an axis of rotation coincident with c-d. Each link arm 44 is connected to a bracket 48 using another revolute joint 50 whose axis of rotation is parallel to axis c-d. Frame 48 is attached to base 24 and link arm 44 is rotated by an actuator such as an electrical motor (not shown in the figure). When link arm 44 is rotated about the rotational axis of the lower revolute joint 50, the upper axis a-b remains parallel to axis c-d which guarantees the moving platform 22 stays parallel to the base platform 24 during any motion.

The same reasoning as to why the moving platform 22 remains parallel with the base 24 in apparatus 20 in FIG. 1 applies to base 24 and platform 22 of apparatus 40 regardless of the angles of arms 44. Thus platform 22 has a pure translational motion along the X, Y and Z-axes. The extendable center post 26 pushes the platform 22 away from the base 24 and generates tension in the pairs of cables 42 which prevents them from becoming slack.

Figure 3:
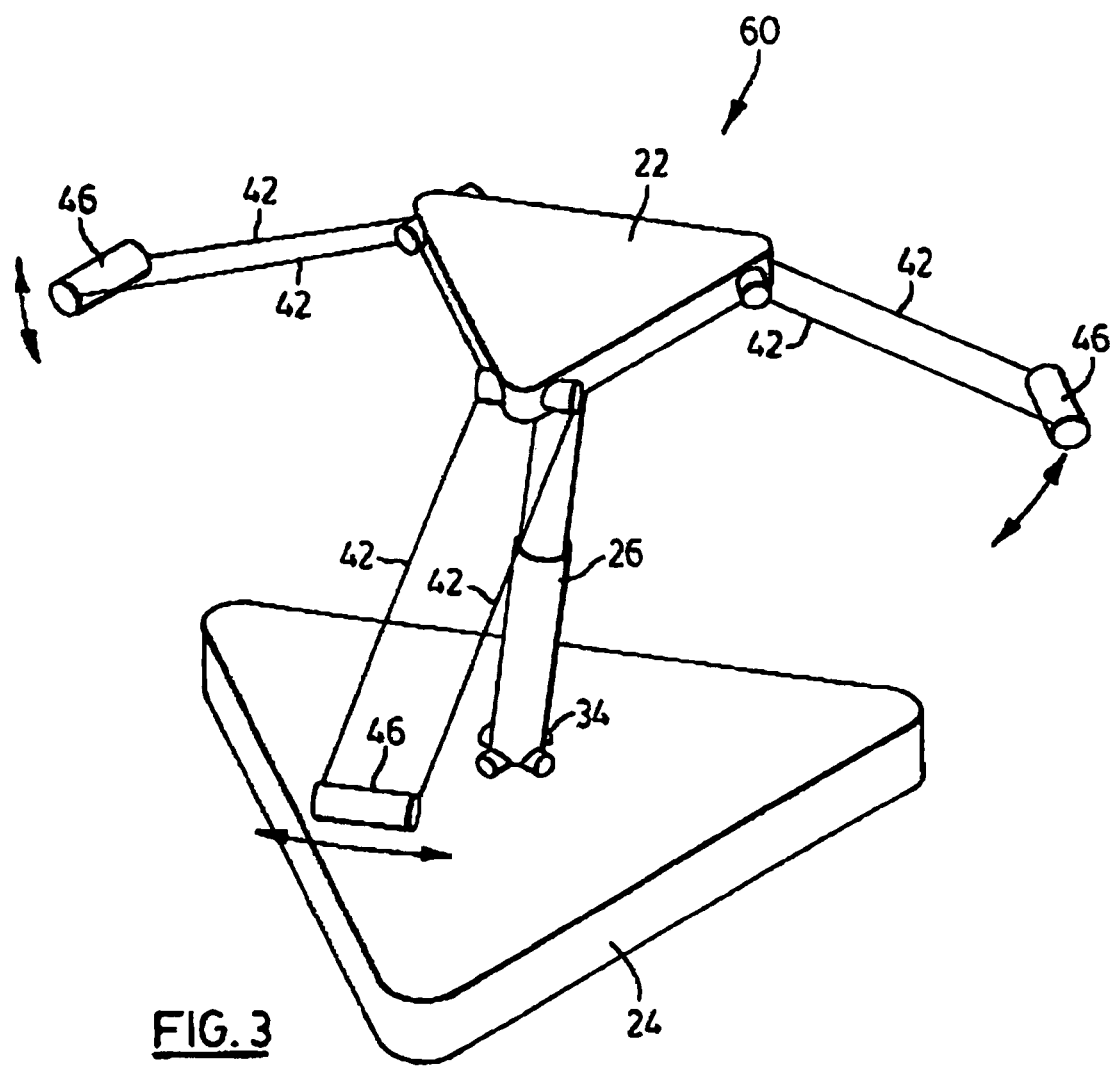
FIG. 3 is a perspective view of another embodiment of three degree of freedom wire actuated parallel robot using passive cables.

FIG. 3 shows an alternative embodiment at 60 of a robot constructed following the same principle as robot 40 with the difference being link arm 44 (FIG. 2) is replaced by actuators that move edge c-d and the other two similar axes of the parallelograms parallel to the base platform. As an example, connection rod 46 can be moved horizontally or vertically by a linear actuator attached thereto (not shown) to change the location of rod 46 without modifying its angle with the base 24. Similarly, connection rod 46 can be attached to a rotary actuator for movement in a plane parallel to the base platform 24 to provide the desired movement of the platform 22. For all these different motions as long as the axis of connection rods 46 are maintained parallel to the base platform 24 the mechanism 60 will have three translational degrees of freedom in the X, Y and Z directions.

Mechanisms 40 and 60 also include a computer controlled motor controller (not shown) such as computer 35 connected to controller 31 shown in FIG. 1.

3. Six-degree-of-freedom Parallel Mechanism using Passive Cables

Figure 4:
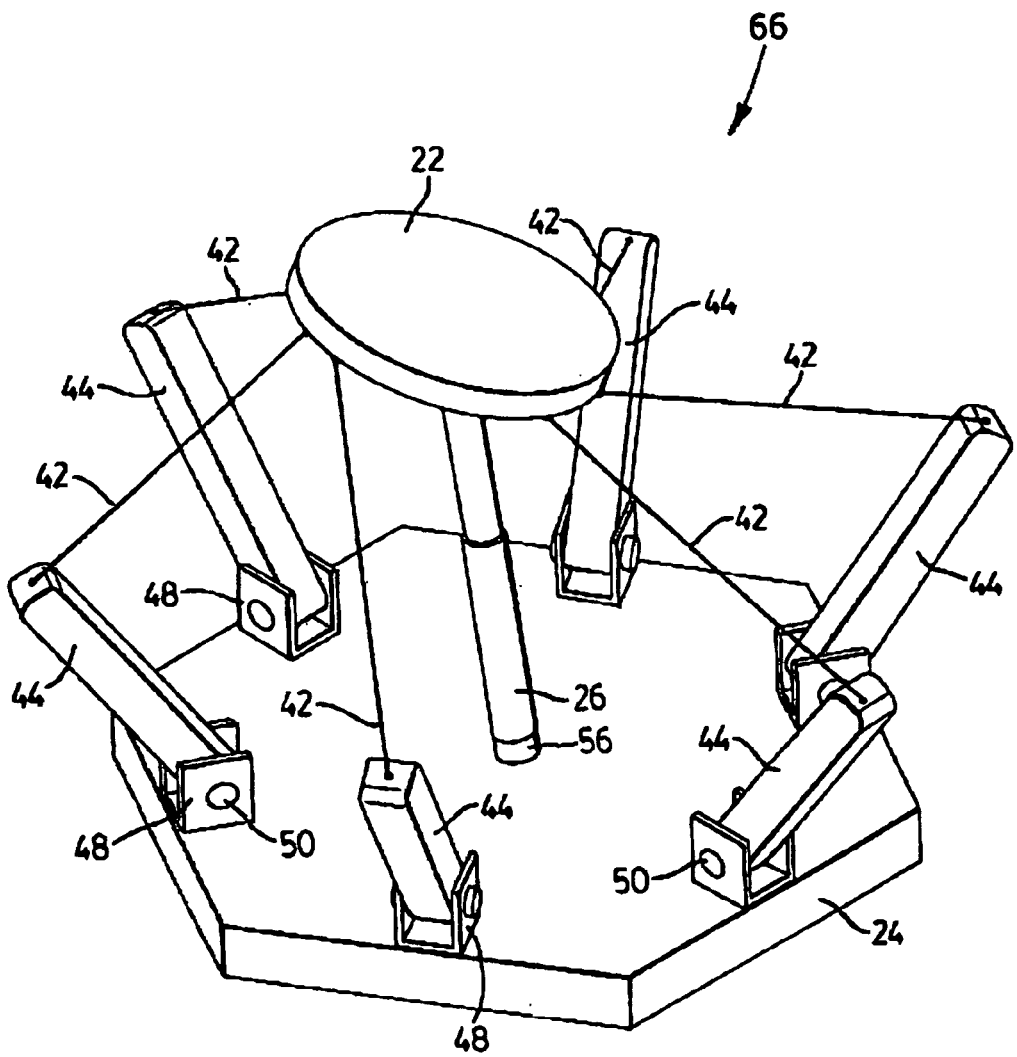
FIG. 4 is a perspective view of a six DOF parallel mechanism using passive cables.

A generalization of the design shown in FIG. 3 can be extended to a 6 degree of freedom robot as shown generally at 66 in FIG. 4. In this design the extendible center post 26 is attached to the base 24 and moving platform 22 by two spherical joints 56, or one spherical joint and one universal joint instead of two universal joints as is used in mechanisms 20, 40, and 60 in FIGS. 1, 2, and 3. The parallelograms in the previous mechanisms 20, 40 and 60 defined by the pairs of parallel cables are used to impose mechanical constraints to eliminate three rotational degrees of freedom. In the six degree of freedom robot 66 the ends of cables 42 are connected to separate actuators to provide three extra degrees of freedom. In this design the six cables 42 are still passive and are connected at one end to an associated arm 44 and at the other end to moving platform 22. Each link arm 44 is connected to a frame 48 with a revolute joint 50. Frame 48 is attached to the base 24 and link arm 44 is rotated by an actuator such as an electrical motor not shown but similar to the motors and controller shown in FIG. 1. When link arm 44 is rotated the end points of the cables connected to arms 44 change and as a result the position and orientation of the moving platform 22 can be controlled. The central extensible post 26 applies a pushing force through a spring or air cylinder (not shown in the figure) to keep cables 42 in tension. It should be noted that the design is not limited to the use of assembly 44, 48 and 50 to move the end points of the cables and any mechanism and actuator (linear or rotary) can be used to achieve the same number of degrees of freedom, as discussed with respect to the mechanism of FIG. 3. Also, there are no limitations on the location of cable 42 attachment to the moving platform, however, these locations will change the overall workspace of the robot. Mechanism 66 also include a computer controlled motor controller (not shown) such as computer 35 connected to controller 31 shown in FIG. 1 for controlling each of the actuators.

The six degree-of-freedom robotic mechanism of FIG. 4 may be converted to a five degree-of-freedom device by replacing spherical joints 56 connecting post 26 to base 24 and end effector 22 with universal joints and removing one of the six cables 42 and associated link arm 44 and motor. The five degrees of freedom will include three translational and two rotational motions (pitch and yaw). The replacement of the spherical joints with universal joints will eliminate the roll motion of moving platform 22 with respect to post 26 and fixed platform 24.

4. Three-to-five DOF Parallel Mechanism using Passive and Active Cables

Figure 5:
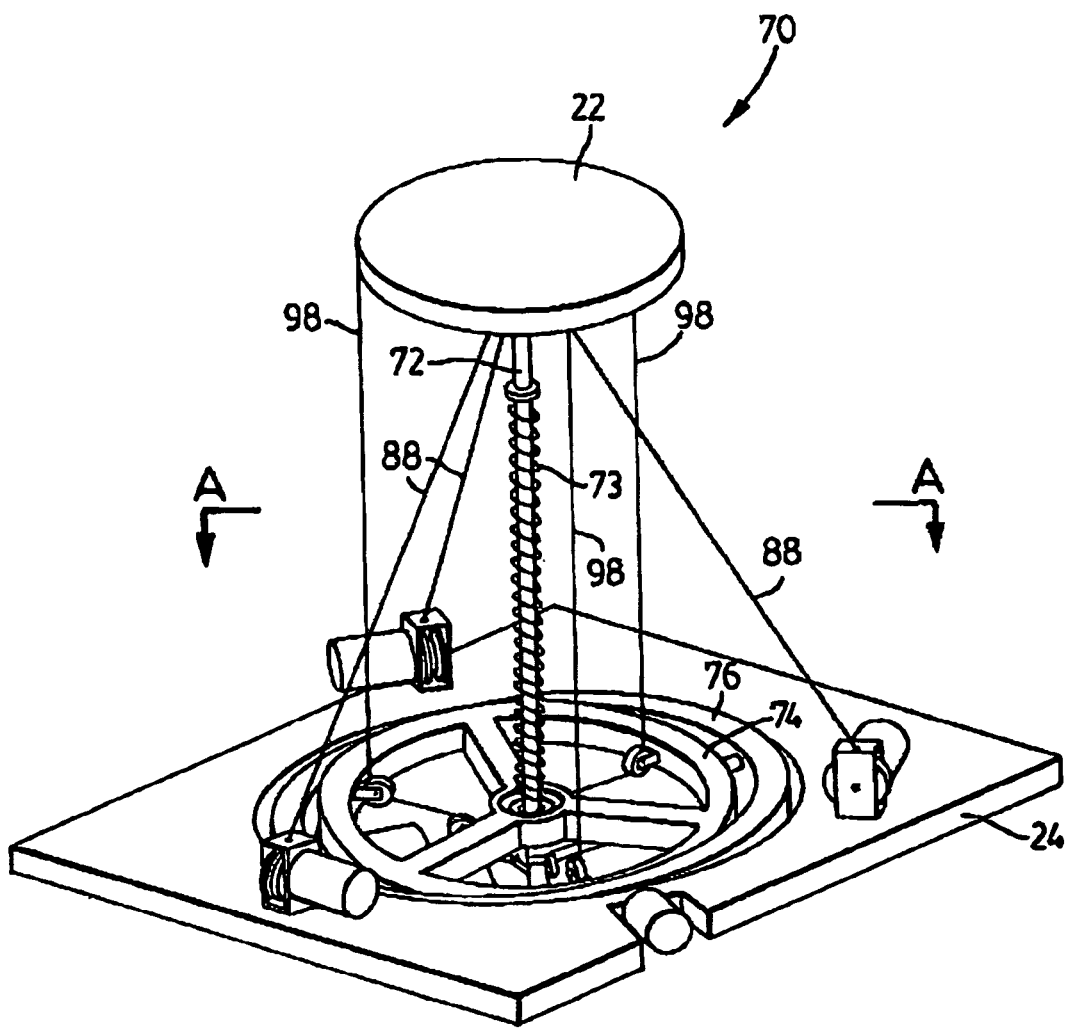
FIG. 5 is a perspective view of a three-to-five DOF parallel mechanism using active and passive cables.
Figure 6:
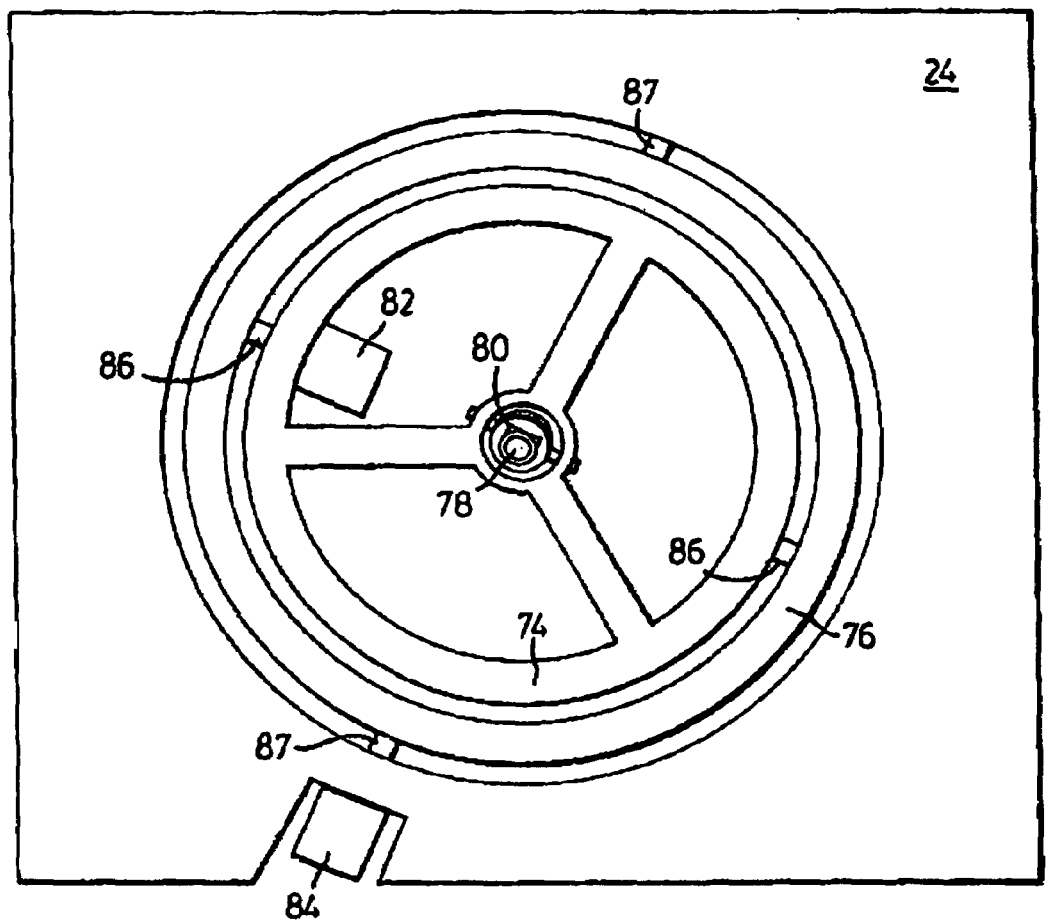
FIG. 6 shows a top view (view A—A in FIG. 5) of the base platform and rings of the mechanism of FIG. 5.

Referring to FIG. 5, there is shown generally at 70 a hybrid parallel mechanism using a combination of active and passive cables to provide five degrees of freedom for moving platform 22, including three translational and two rotational motions. In this embodiment of the invention, base platform 24 includes two rings 76 and 74. The top view of base 24 and the two rings is shown in FIG. 6. Ring 76 is attached to base platform 24 by two revolute joints 87 diametrically located on opposite sides of ring 76 and having coextensive or coincident axis of rotation. Revolute joints 87 are fixed in ring 76, and held by collars on base 24.

Actuator 84 is mounted on base 24 and its shaft is connected to one of the revolute joints 87 to provide a relative rotational motion of ring 76 with respect to base 24 so that ring 76 can be rotated out of the plane of base 24. Similarly, ring 74 is attached to ring 76 by two revolute joints 86 diametrically located on opposite sides of ring 74 and with revolute joints 86 having coextensive or coincident axis of rotation. The revolute joints 86 are fixed in ring 76 and held by collars in ring 74. The coextensive axes of rotation of the two revolute joints 86 are normal to the coextensive axes of rotation of the two revolute joints 87. Actuator 82 is mounted on ring 74 and its shaft is connected to one of the revolute joints 86 to provide a relative rotational motion between rings 74 and 76 for rotating ring 74 out of the plane defined by ring 76. As a result, ring 74 is connected to base 24 through ring 76 and has two rotational degrees of freedom (pitch and yaw) and its orientation is set by motors 82 and 84.

At the center of ring 74 there is collar 78 which is attached to ring 74 by a universal joint 80. When the planes of rings 74, 76 are in the same plane as base 24 and collar 78 is normal to the base the axes of rotation of universal joint 80 and revolute joints 86 and 87 are all in a single plane. Also, center post 72 can only slide in collar 78 without any rotation. Platform 22 (FIG. 5) is connected to center post 72 by universal joint 89 (FIG. 7(a)). Universal joint 89 prevents the rotation of platform 22 with respect to the longitudinal axis of center post 72.

Figure 7A:
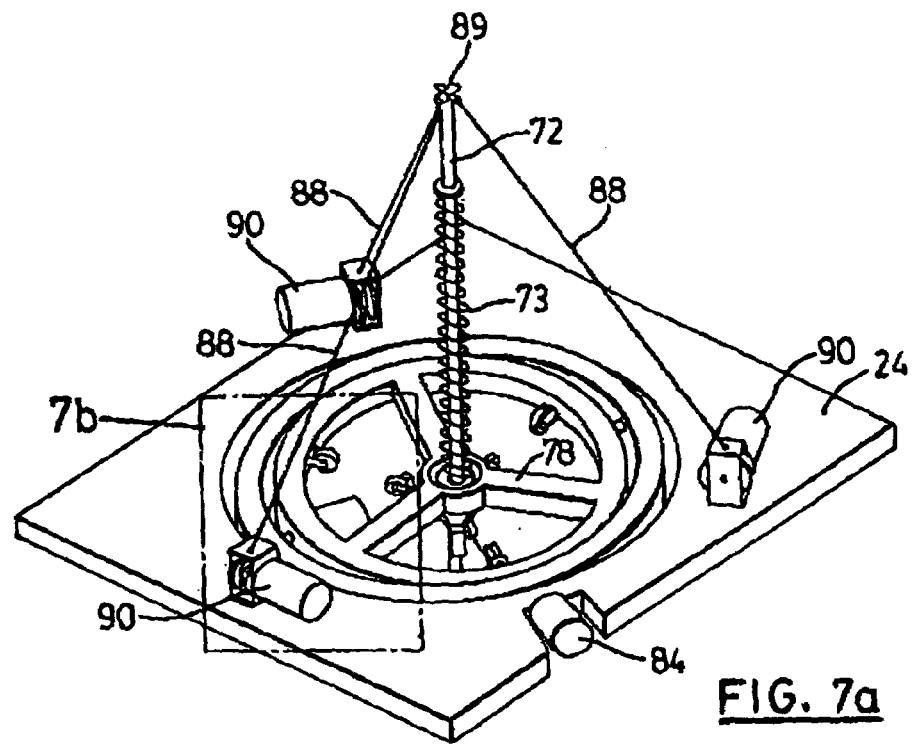
FIG. 7(a) shows an overall perspective view of the configuration of active cables in the mechanism of FIG. 5.
Figure 7B:
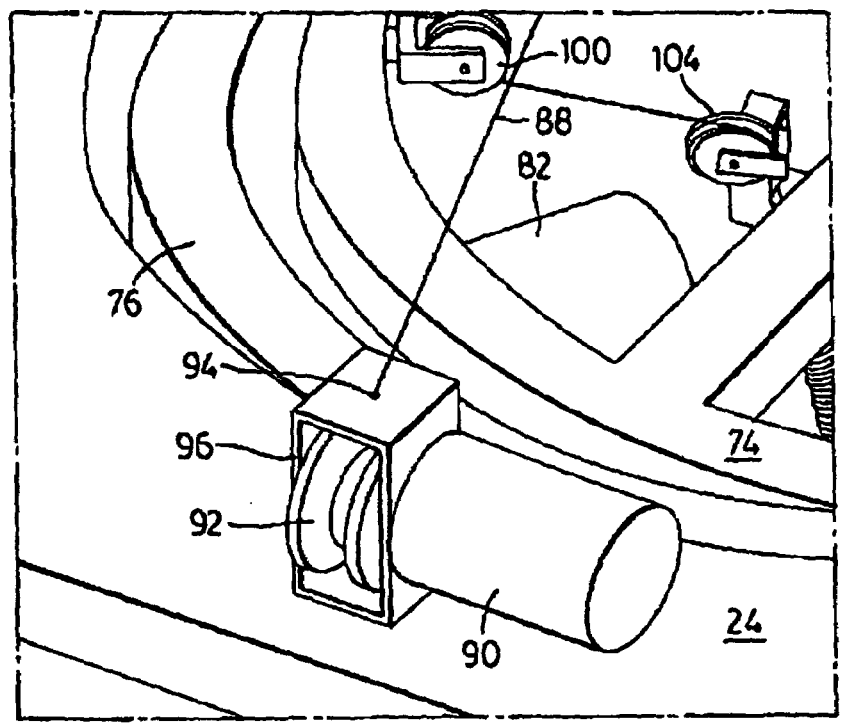
FIG. 7(b) shows a detailed view of the portion of FIG. 7(a) in the square box.

Referring again to FIG. 7(a), the top end of center post 72 is attached to three active cables 88 which are used to orient the center post 72 in space. FIG. 7(a) shows the mechanism without the passive cables 98 and movable platform 22 to show more clearly the active cables 88. The active cables 88 are attached at one end thereof to the tip of center post 72. Referring particularly to FIG. 7(b), each of the active cables 88 is pulled and accumulated using an associated winch assembly that includes a pulley 92 and a motor 90 which rotates the pulley. Pulley 92 and motor 90 of each winch assembly is mounted in housing 96 which is attached to the base platform 22 and each of the cables 88 passes through a hole 94 located in the top of the associated housing 96. The tip of center post 72 can be moved to any point in the workspace by changing the length of active cables 88. The center post 72 applies a pushing force to cables 88 to keep them in tension at all times. This force can be generated by means of passive elements such as spring 73 which applies the force between collar 78 and center post 72. In an alternative embodiment an active element such as a linear motor (not shown in the figures) may be used instead.

Figure 8A:
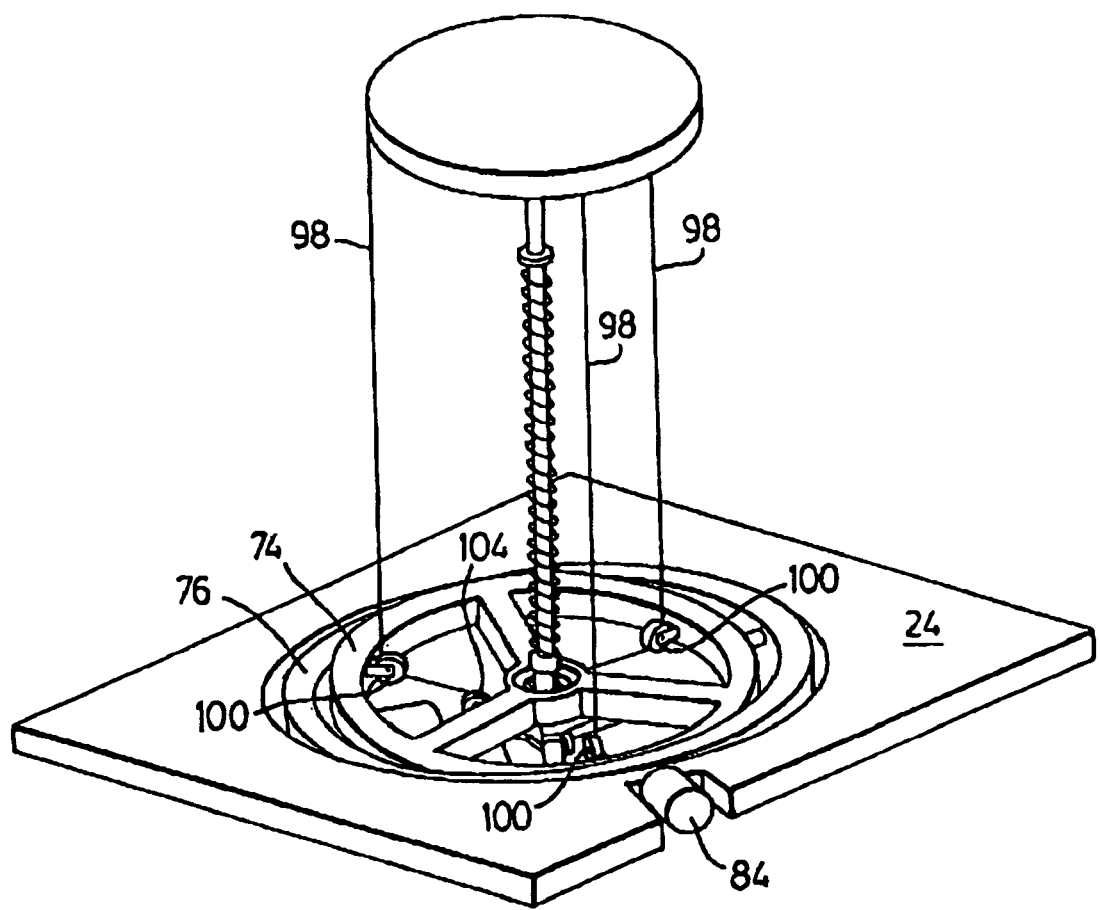
FIG. 8(a) shows an overall perspective view of the configuration of the passive cables in the mechanism of FIG. 5.
Figure 8C:
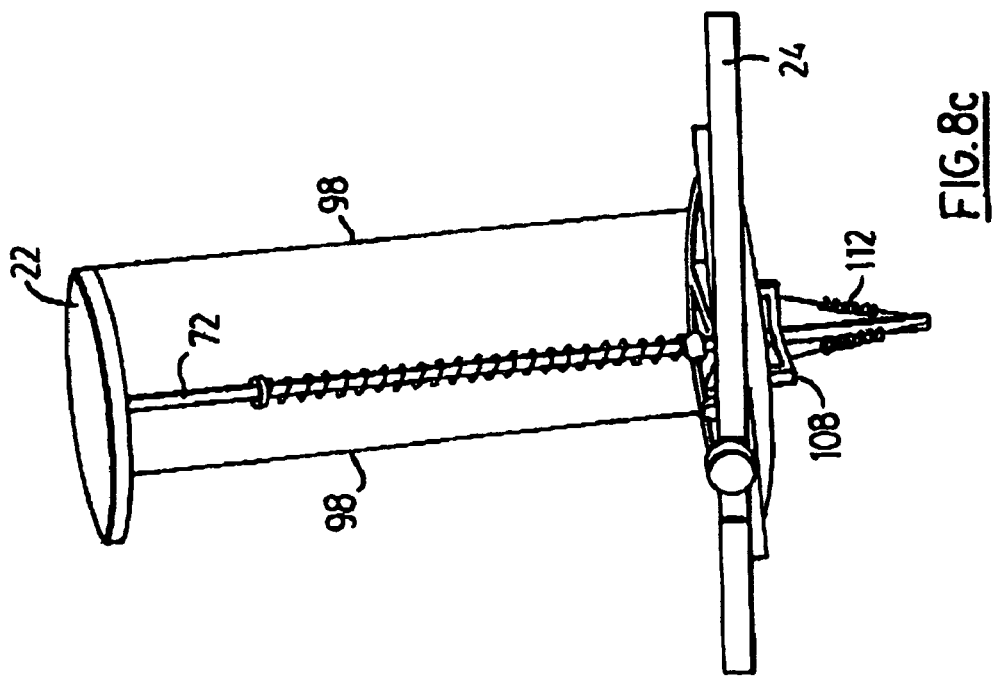
FIG. 8(c) shows a side view of the passive cable configuration of FIG. 8(a)
Figure 8B:
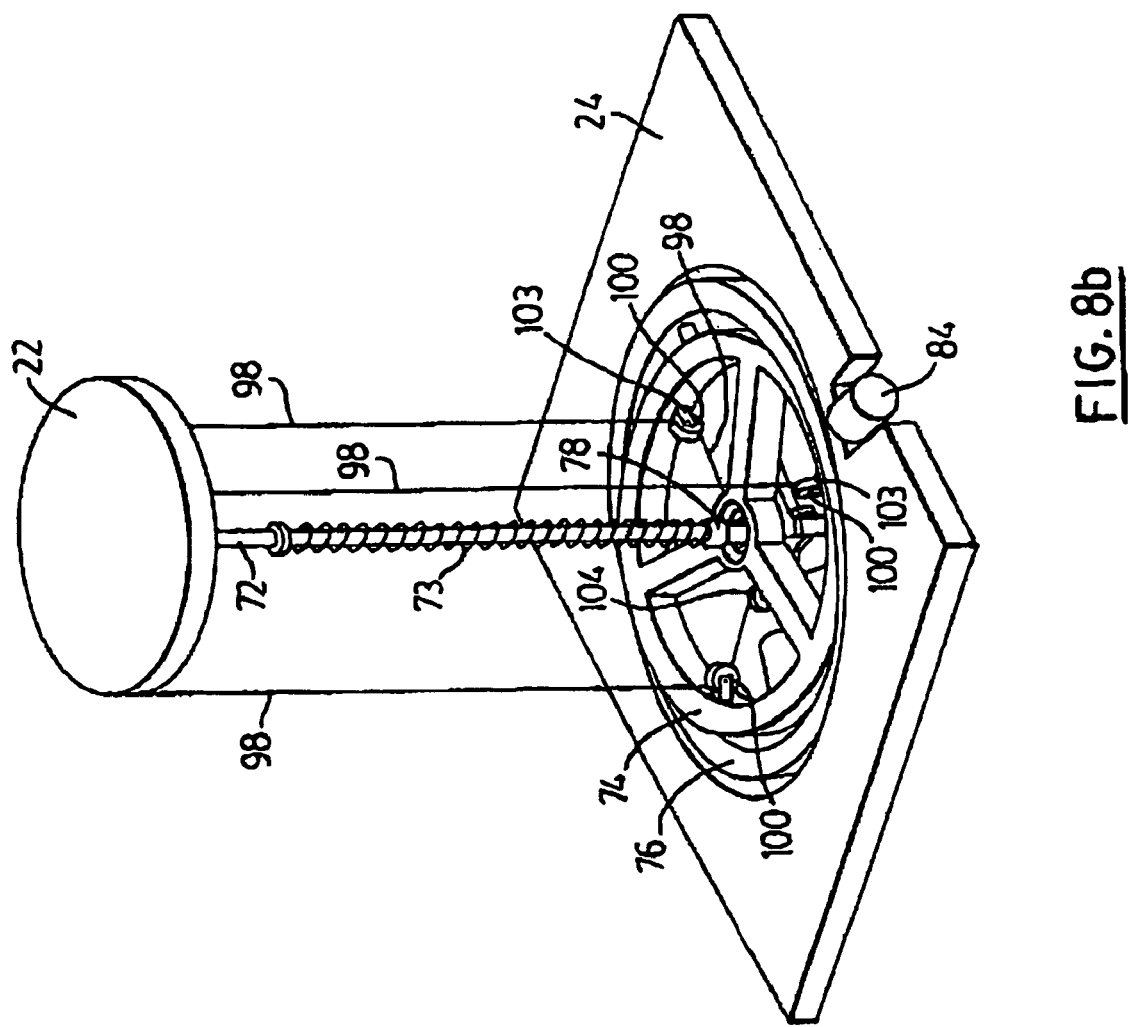
FIG. 8(b) shows a detailed view of a portion of the passive cable mechanism of FIG. 8(a)

There are three passive cables 98 (best seen in FIGS. 8(a) and 8(b)) attached at one end to the moving platform 22 and at the other end to the bottom end of center post 72 (see FIG. 9). Passive cables 98 are parallel to each other in the section between ring 74 and platform 22 (FIG. 10) and are used to maintain the moving platform 22 parallel to ring 74 so that any orientation of ring 74 transfers to platform 22.

Referring to FIG. 8(a), the passive cables 98 from platform 22 are guided through pulleys 100 which are mounted to brackets 103 (see FIG. 8(b)), which in turn are attached to ring 74 using revolute joints (not shown). The revolute joints allow the pulleys 100 to adjust themselves with respect to the direction of the associated cables 98.

Three other pulleys 104 (see FIG. 9) are mounted in brackets 106 which are mounted on a frame 108 which is attached to collar 78. The axes of pulleys 100 are in the same plane which passes through the center of universal joint 80 (FIG. 6). Also, the axes of pulleys 104 are in the same plane which passes through universal joint 80. These conditions are required to keep the platform 22 parallel to ring 74.

Pulleys 104 guide the cables 98 to their attachment point at the bottom end of center post 110. Three springs 112 are in series with cables 98. These three springs 112 are used to provide tension in passive cables 98 and also compensate for small changes in the length of cables 98 when the center post 72 deviates from its vertical position.

Figure 10:
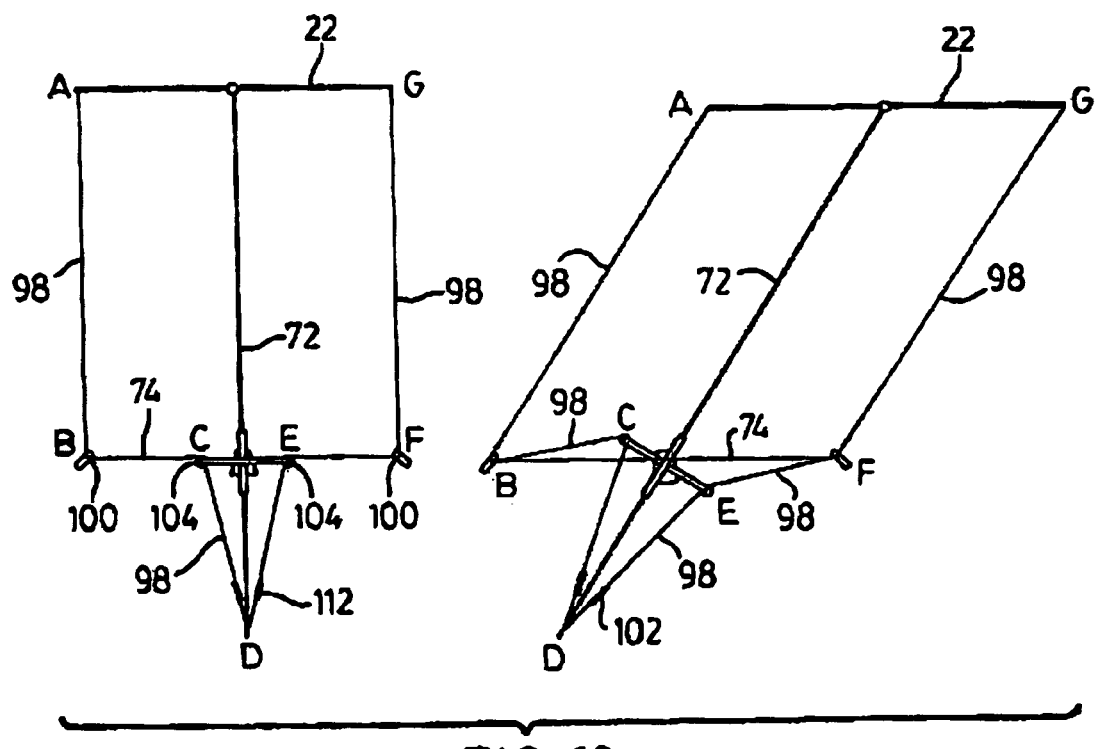
FIG. 10 shows the mechanism of FIG. 5 in two positions, vertical and tilted at an angle from the vertical showing the moving platform remains parallel to the base platform.

The three passive cables 98 maintain the platform parallel to ring 74 as shown in FIG. 10 for a 2D situation. In an ideal configuration, pulleys 100 and 104 have zero diameters. As seen in the figure, regardless of the angle of 72 BC=EF and DC=DE. Since the overall length of the cables ABCD and GFED are equal, AB=GF all the time. This constitutes a parallelogram which guarantees end effector 22 stays parallel to base platform 24.

The embodiment shown at 70 in FIG. 5 is a five degree-of-freedom mechanism that has three translational motions of the moving platform 22 that are provided by actuators 90 and active cables 88, and the two rotational degrees of freedom are provided by actuators 82 and 84 to orient moving platform 22. The translational and rotational motions of the moving platform are independent which result in simple kinematics of the mechanism. Mechanism 70 can be converted into a three degree of freedom mechanism by removing rings 74 and 76 and connecting pulleys 100 and their frames directly to base 24. In this configuration platform 22 is always parallel to the base and its location can be changed by active cables 88 and motors 90. Alternatively, a three degree of freedom mechanism can be obtained by locking rings 74 and 76 with respect to base 24.

5. Alternative Three-to-five DOF Parallel Mechanism using Active Cables

Figure 11A:
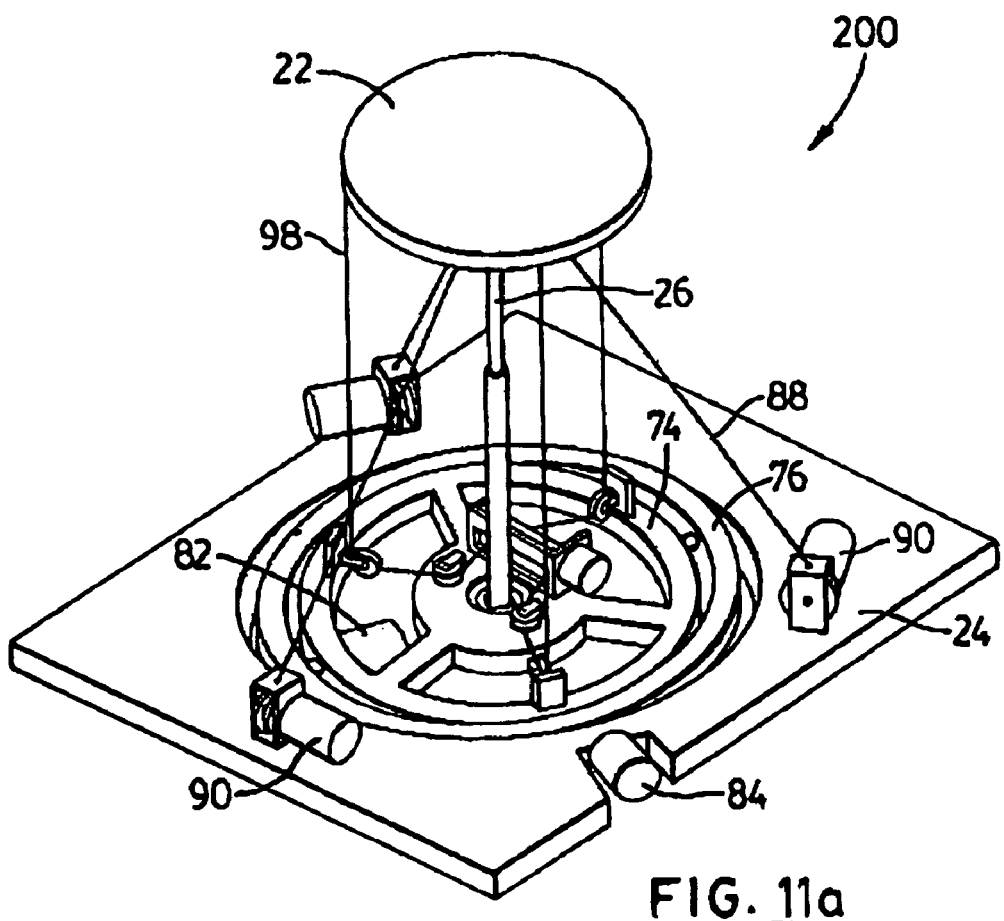
FIG. 11(a) is an overall perspective view of a three-to-five DOF robotic mechanism.

Referring to FIG. 11(a), there is shown generally at 200 a hybrid parallel mechanism using a combination of active and passive cables to provide five degrees of freedom for moving platform 22, including three translational degrees of freedom and two rotational degrees of freedom. The overall structure of mechanism 200 is very similar to mechanism 70 in FIG. 5 except for the central post 26 and the way passive cables 98 keep the moving platform 22 parallel to ring 74. The central post in this design is extensible and connected to both moving platform 22 and ring 74 with universal joints. It further applies an active or passive pushing force to the platform and ring via a spring or air cylinder (not shown in the figure) or it could be a linear motor to continuously adjust the force.

Figure 11B:
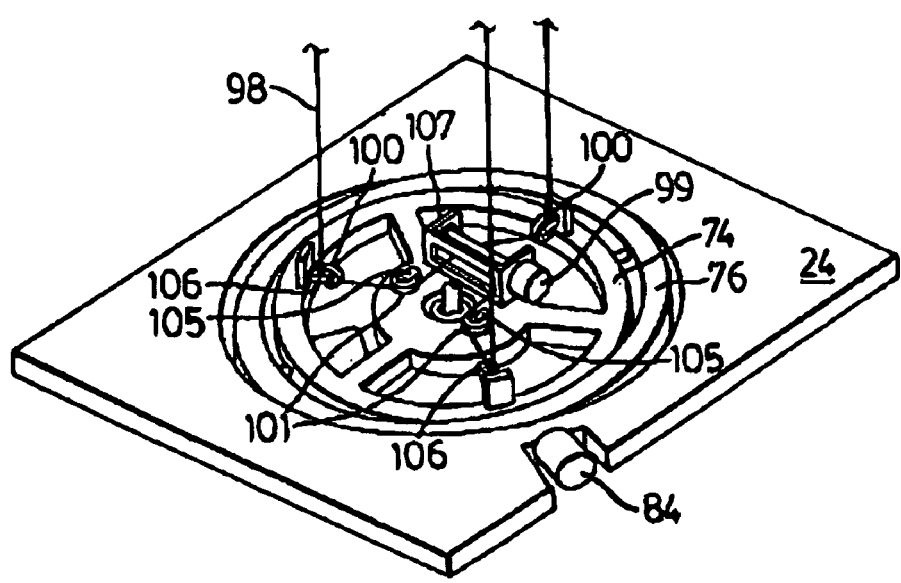
FIG. 11(b) is a close up detailed perspective view of the wire tensioning mechanism of the robotic mechanism of FIG. 11(a)
Figure 12:
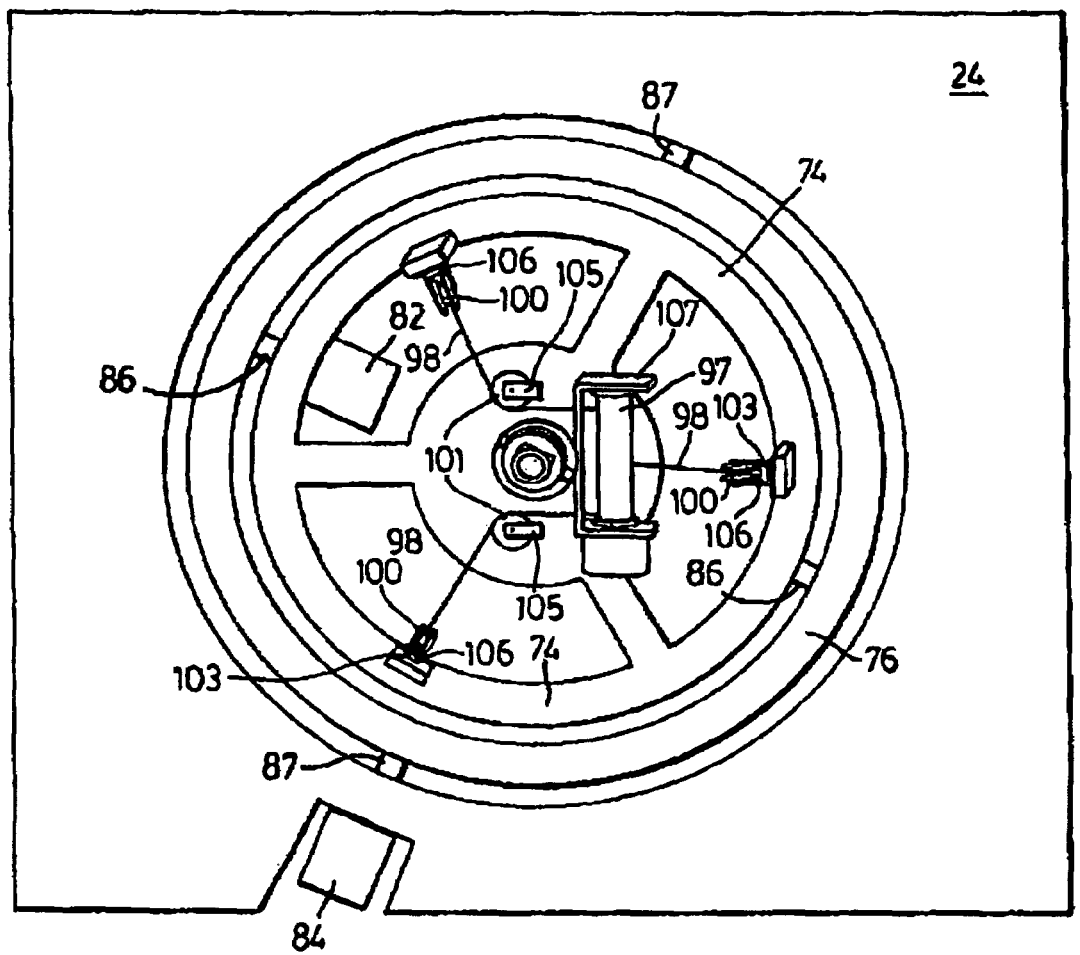
FIG. 12 is a top perspective view of the mechanism of FIG. 11a absent the end effector and central post showing the tensioning mechanism for the passive cables used to maintain the moving platform parallel to the base.

A close-up of the mechanism that keeps platform 22 parallel to ring 74 is shown in FIGS. 11b and 12. Passive cables 98 are guided to a winch mechanism which includes a drum 97 mounted for rotation in a frame 107 and driven by a motor 99. Frame 107 is attached to ring 74. Three pulleys 100 are mounted on frames 106 that are connected to ring 74 by revolute joints 103 and spaced 120° with respect to each other around ring 74. Two pulleys 101 are mounted on associated frames 105 that are connected directly to ring 74. These two pulleys 101 receive two of the cables 98 from two of the pulleys 100 which are then wrapped on drum 97. Cable 98 from the third pulley 100 goes directly to drum 97, best seem in FIG. 12. The cables 98 are wound on drum 97 by applying a torque generated by passive elements like rotational springs or active elements such as electrical or air motors shown schematically by 99. As seen in FIG. 12 the lengths of cables 98 between pulleys 100 and drum 97 are independent from the position and orientation of platform 22. Also, cables 98 are wrapped around one single drum 97 and as a result the change in the lengths of cables 98 between pulleys 100 and platform 22 will be the same in any robot's configurations. Now, if cables 98 are attached to platform 22 such that their lengths between pulleys 100 and connection points on platform 22 become equal and parallel to the central post 26, each two cables 98 will make a parallelogram and therefore platform 22 will remain parallel to ring 74 regardless of its position in the workspace.

Figure 13:
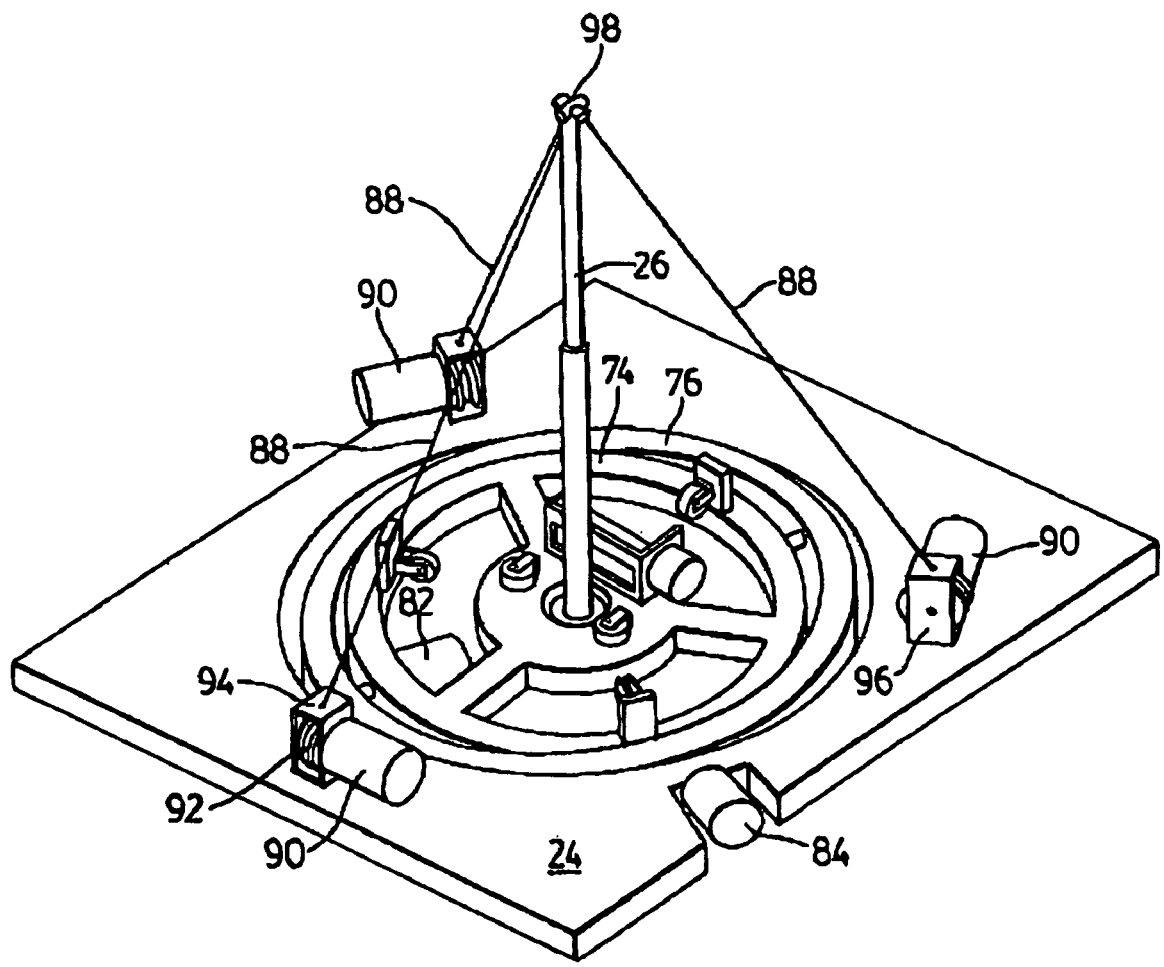
FIG. 13 shows the configuration of active cables for positioning the central post of the mechanism of FIG. 11.

FIG. 13 shows the arrangement of the active cables 88 that are the same as the arrangement of the active cables in mechanism 70 in FIG. 7(a). Referring again to FIG. 11a, mechanism 200 is a five degree of freedom mechanism that includes three translational degrees of freedom of the moving platform 22 provided by actuators 90 and active cables 88, and the two rotational degrees of freedom provided by actuators 82 and 84 to orient moving platform 22 in its workspace. The translational and rotational motions of the moving platform 22 are independent of each other which results in simple kinematics of the mechanism. Mechanism 200 may be converted into a three degree of freedom mechanism by removing rings 74 and 76 and connecting pulleys 100 and their frames directly to base 24. This way platform 22 is always parallel to the base 24 and its location can be changed by changing the length of active cables 88 using motors 90.

In summary, the embodiment shown in FIGS. 11, 12 and 13 is a 5 dof mechanism. In this mechanism the second set of cables are not attached to the bottom end of the post. They are pulled and collected by winch 97. There are five pulleys mounted on the inner ring in order to guide the three cables to the winch. This winch pulls and collects all three cables simultanously and hence keeps the cable lengths between the inner ring and the end-effector equal. Therefore, the end-effector stays parallel to the inner ring plane. Winch 97 can be connected to a motor or to a rotational spring in order to pull cables and keep them in tension. In this mechanism the post can be as simple as the mechanisms of FIGS. 1 to 5.

6. Three-to-five DOF Parallel Mechanism using Active Cables

Figure 14:
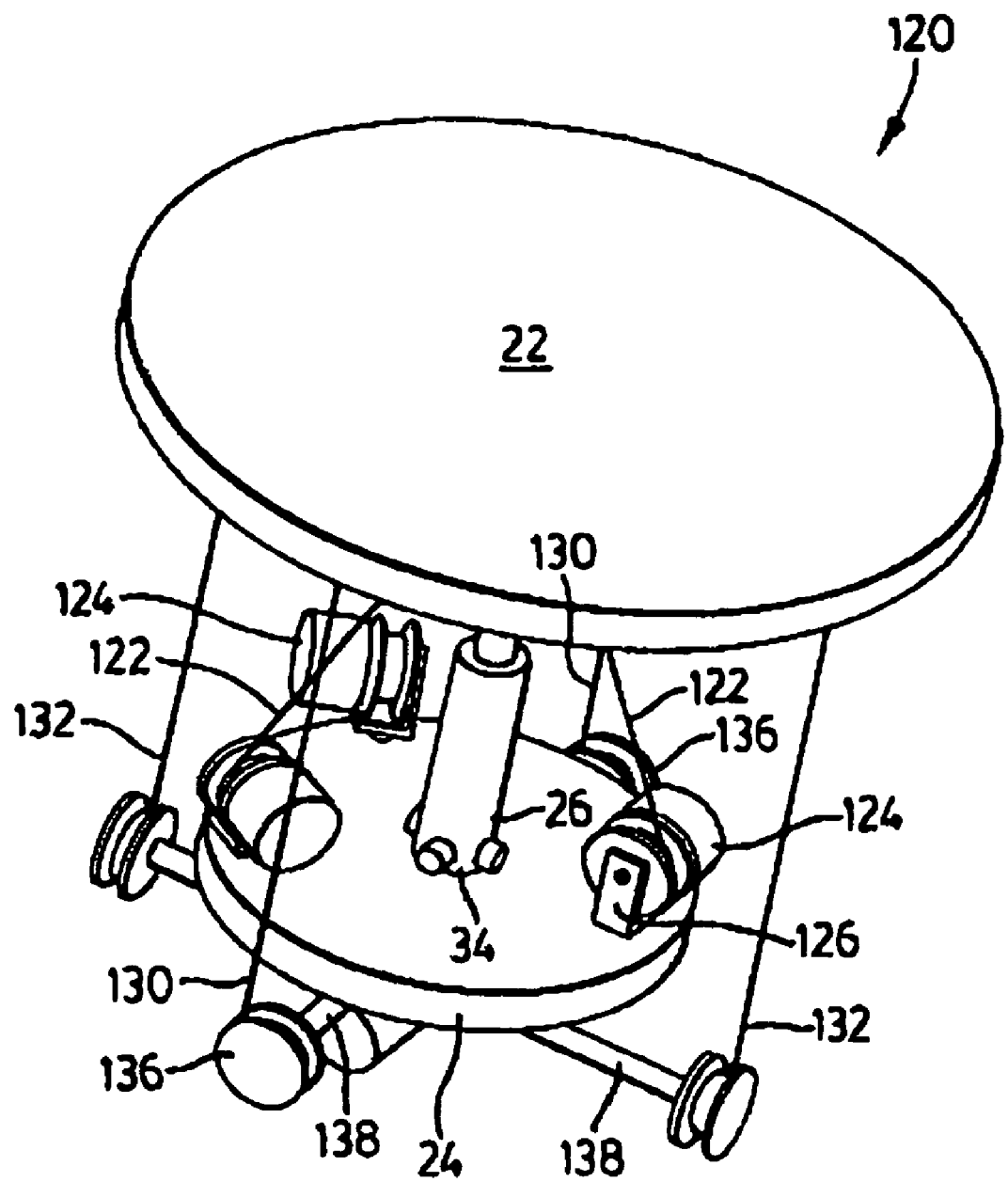
FIG. 14 is a perspective view of a hybrid parallel mechanism using seven active cables that can produce between three and five degrees of freedom for the moving platform.
Figure 15:
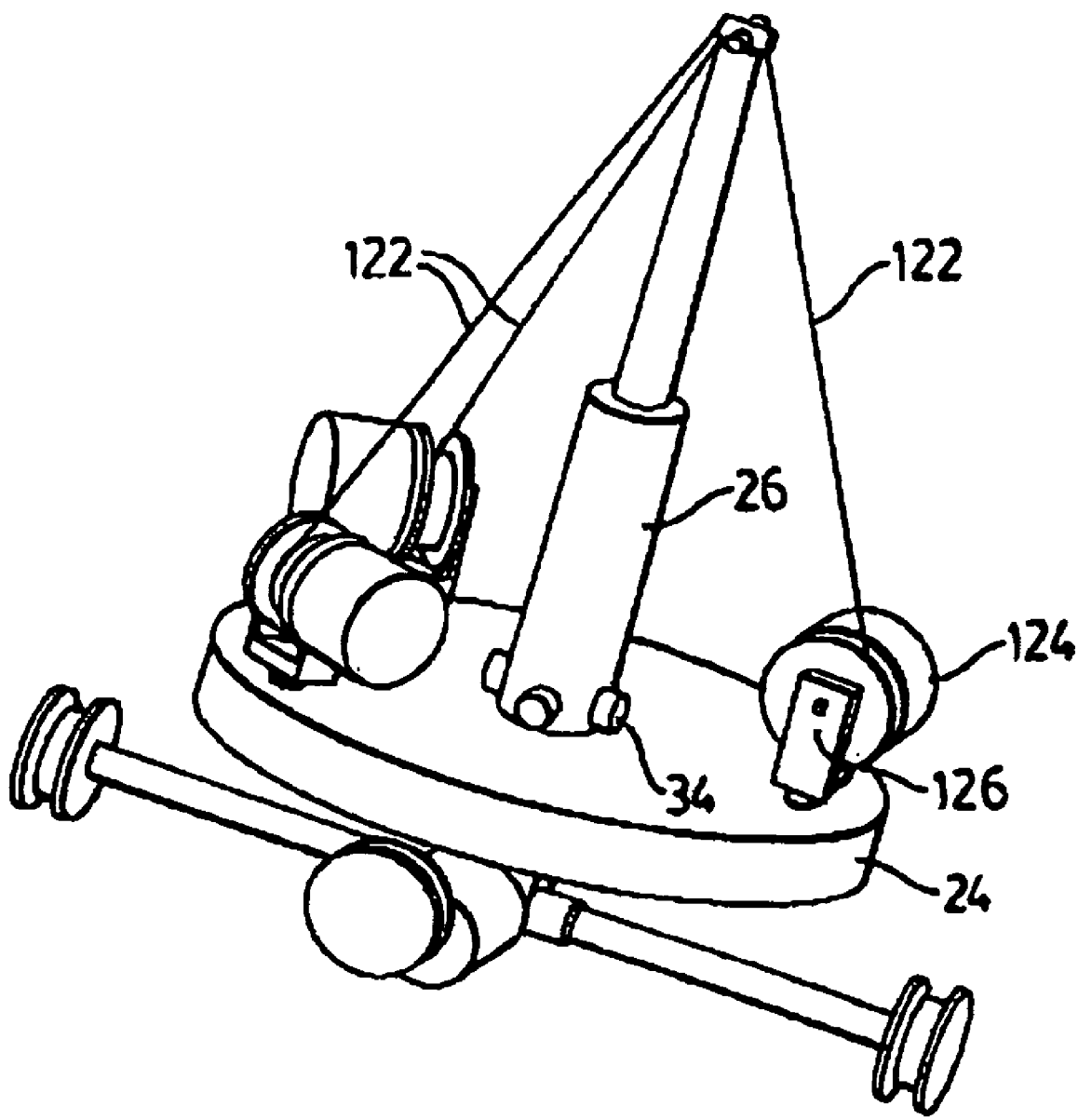
FIG. 15 is a perspective view of the central extensible rod and three active cables for the mechanism of FIG. 14.

FIG. 14 shows a hybrid parallel mechanism at 120 using seven active cables that can produce between 3 and 5 degrees of freedom for the moving platform 22. In this embodiment, the moving platform 22, base platform 24, and extensible center post 26 and universal joint 34 are similar to the previous embodiments. Three active cables 122 as shown in FIGS. 14 and 15 are attached at one end to the top of extensible center post 26 and the other ends are attached to winches 124 which are mounted in bracket frames 126 attached to platform 24. Winches 124, which control the lengths of cables 122 control the end location of the extensible rod in the space.

Figure 16:
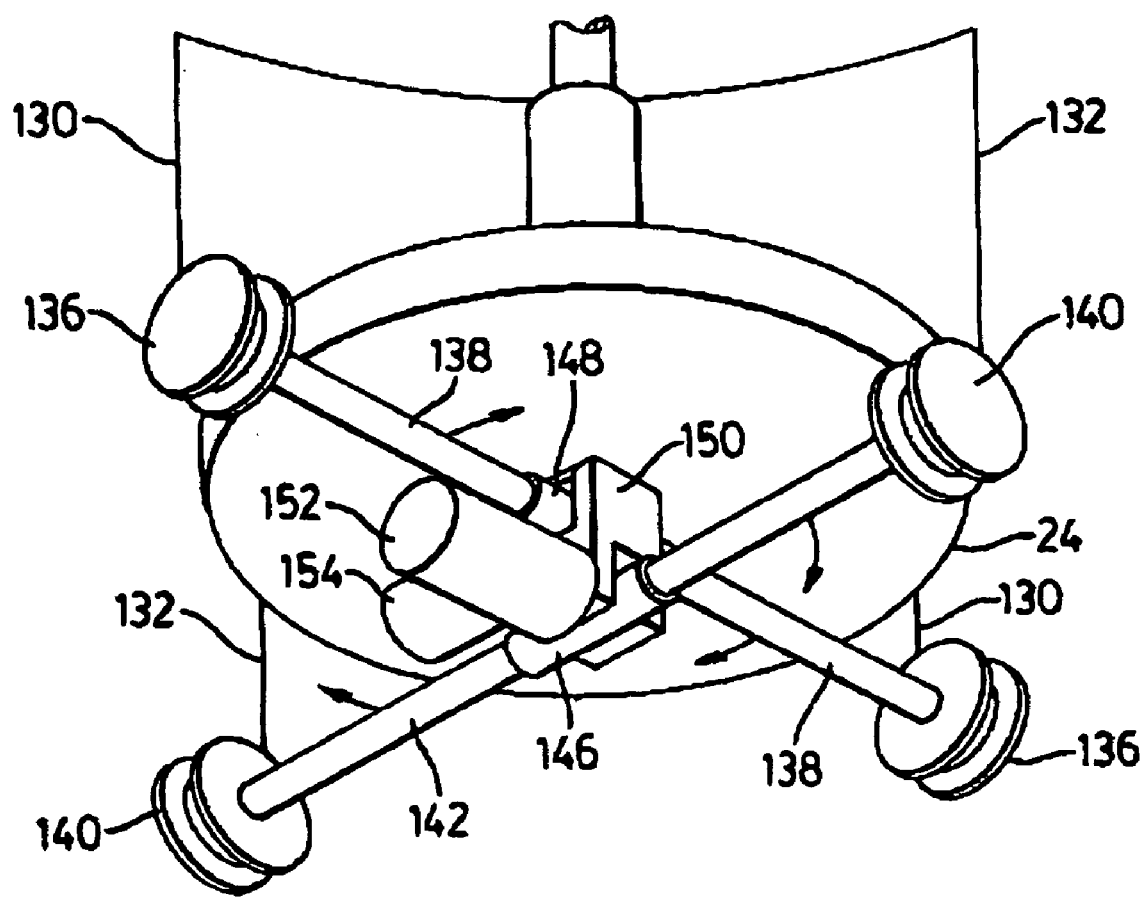
FIG. 16 is a bottom view of the mechanism of FIG. 14.

Referring particularly to FIGS. 14 and 16, two pairs of cables 130 and 132 form two parallelograms. The pair of cables 130 are pulled and collected by two pulleys 136 mounted on the ends of shaft 138. The pair of cables 132 are pulled and collected by two pulleys 140 mounted on the ends of shaft 142. Both shafts 138 and 140 and the associated pulleys mounted on the ends of the respective shafts form a single body and therefore, the two pulleys rotate simultaneously with the shaft. Shaft 142 rotates inside collar 146. There is also a source of constant torque acting between shaft 142 and collar 146. This torque can be applied by a spring which maintains the cables 132 in tension. Similarly, shaft 138 rotates inside a collar 148. There is also a source of constant torque acting between shaft 138 and collar 148 which may be applied by a spring and this keeps the cables 130 in tension. Maintaining the shafts 138 and 142 parallel to base 24 and platform 22' ensures that the platform 22 is parallel to the base 24. Collars 146 and 148 are mounted to frame 150 and collar 146 is connected to motor 152 and collar 148 is connected to motor 154. The motors rotate the collars connected thereto and this rotation is directly transferred to the platform 22 which alters the orientation of the platform 22.

Each of the two longitudinal shafts 138 and 142 mounted on the bottom surface of the support plane are responsible for forming a parallelogram. Each of these two shafts has two pulleys rigidly connected at the two ends. The two shafts are initially parallel to the support base plane and normal to each other. In FIG. 16, there are two sleeves shown as 146 and 148. The two shafts pass through these sleeves and can rotate about their longitudinal axis. There are also rotational springs (not shown in the figure) used to apply a torque between each sleeve and its associated shaft. Therefore, the shafts are under a passive torque so that they pull and collect the cables. As a result, the two pairs of parallel cables remain in tension and build two parallelograms which force the end-effector to be parallel with the two longitudinal shafts. If we rotate sleeves 146, 148 about an axis parallel to the support base plane and normal to the longitudinal axes of the shafts using motors 152 and 154, the rotation will be directly transferred to the end-effector because the end-effector has to stay parallel to the longitudinal axes of the shafts. Therefore, the two motors control the orientation of the end-effector and the mechanism will provide 5 degrees of freedom.

7. Three DOF Planar Parallel Mechanism Using Active Cables

Figure 17:
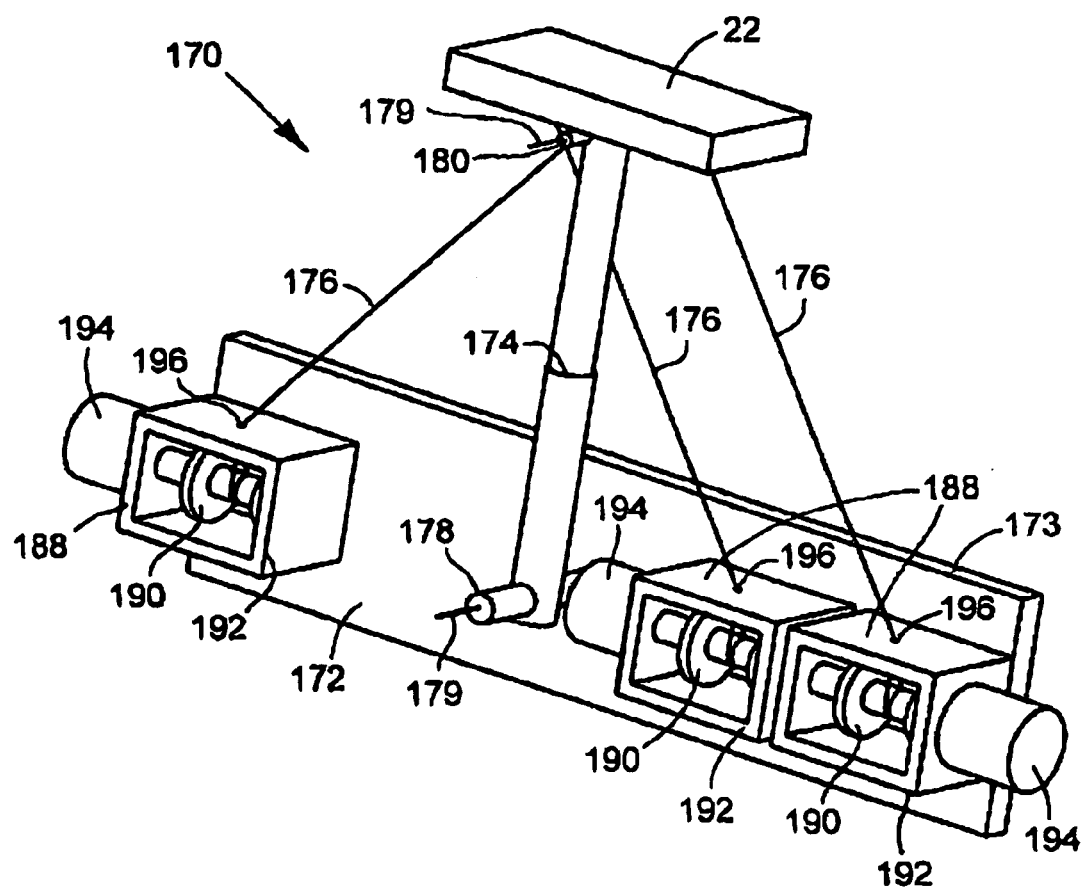
FIG. 17 is a perspective view of three degree of freedom parallel planar manipulator using active cable.
Figure 18:
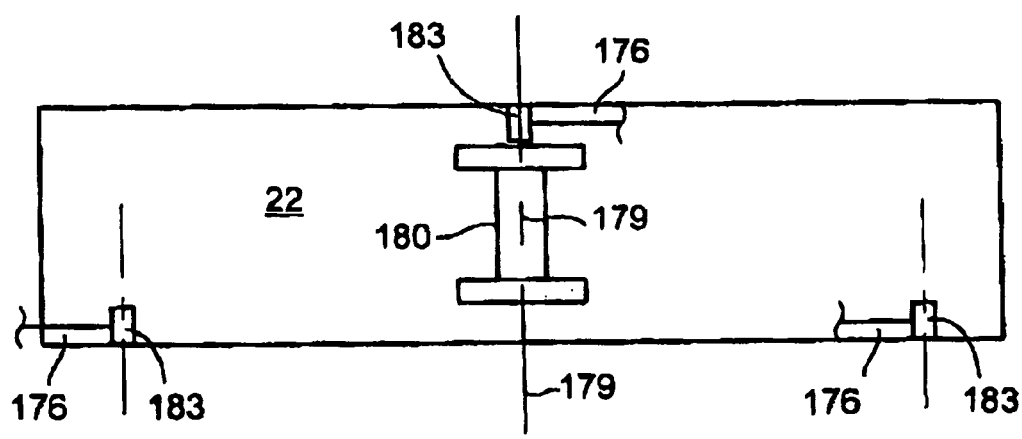
FIG. 18 is a bottom view of the moving platform component connection for planar manipulator.

A general three degree of freedom planar parallel mechanism using active cables constructed in accordance with the presented invention is shown generally at 170 in FIG. 17. The moving platform, 22 is attached to a base plate 172 by extensible or telescoping central post 174 and three active cables 176, through a winch assembly. See FIG. 18 for details. The base plate 172 provides a reference for the moving platform 22, and its function is identical to the base platform 24 of FIG. 1. The central post 174 is connected by revolute joint 180 to the bottom of moving platform 22 having an axis of rotation 179 (see FIG. 18 for details), and base plate 172 by a revolute joint 178 with the pivoting axes 179 of the revolute joints 178 and 180 being perpendicular to the workspace of the robot. The out of plane moment induced on the moving platform 22 is counter-balanced by these revolute joints. A clevis pin type of revolute joint is a reasonable choice for this component. The cables 176 do not need to be coplanar but they must be held in tension. Cables 176 may be attached to platform 22 by revolute joints 183 having axis of rotation parallel to axis 179 of joint 180. The purpose of the revolute joints 183 is to reduce the amount of bending at the attachment points on the cables 176 to platform 22 which can increase the life span of the cables and joints. Other attachment devices such as eyelets may be used as well to reduce the bending while using the same design. The central post 174 is used to exert a tensile force on the cables 176.

Each of the three winch assemblies 188 used in apparatus 170 comprises a drum 190 in a housing 192 with each drum being driven by a motor 194, with each housing 192 having a pilot hole 196 in its top surface through which the associated cable 176 passes to be wound on drum 190. This mechanism uses a pair of cables 176 (hence two winch assemblies 188) on one side of the central post 174 and at least one cable 176 and its associated winch 188 on the opposite side of post 174. As the motor 194 turns, the drum 190 takes up or releases its associated cable 176. The pilot hole 196 is used to position and set a reference point for the cables. The positioning of the moving platform 22 is controlled directly by the amount of cable released by the drum. A computer controlled motor controller systems (not shown) such as computer 35 connected to controller 31 shown in FIG. 1 is used to adjust the length of the active cables.

In mechanism 170 shown in FIG. 17, the two parallel cables are similar to the parallelograms in the other embodiments and as long as their lengths remain the same the end effector 22 can only move parallel to the base. However, in this design we have considered two motors to be able to change both the orientation and location of the end effector through three actuators.

8. Two DOF Planar Parallel Mechanism Using Active Cables.

Figure 19:
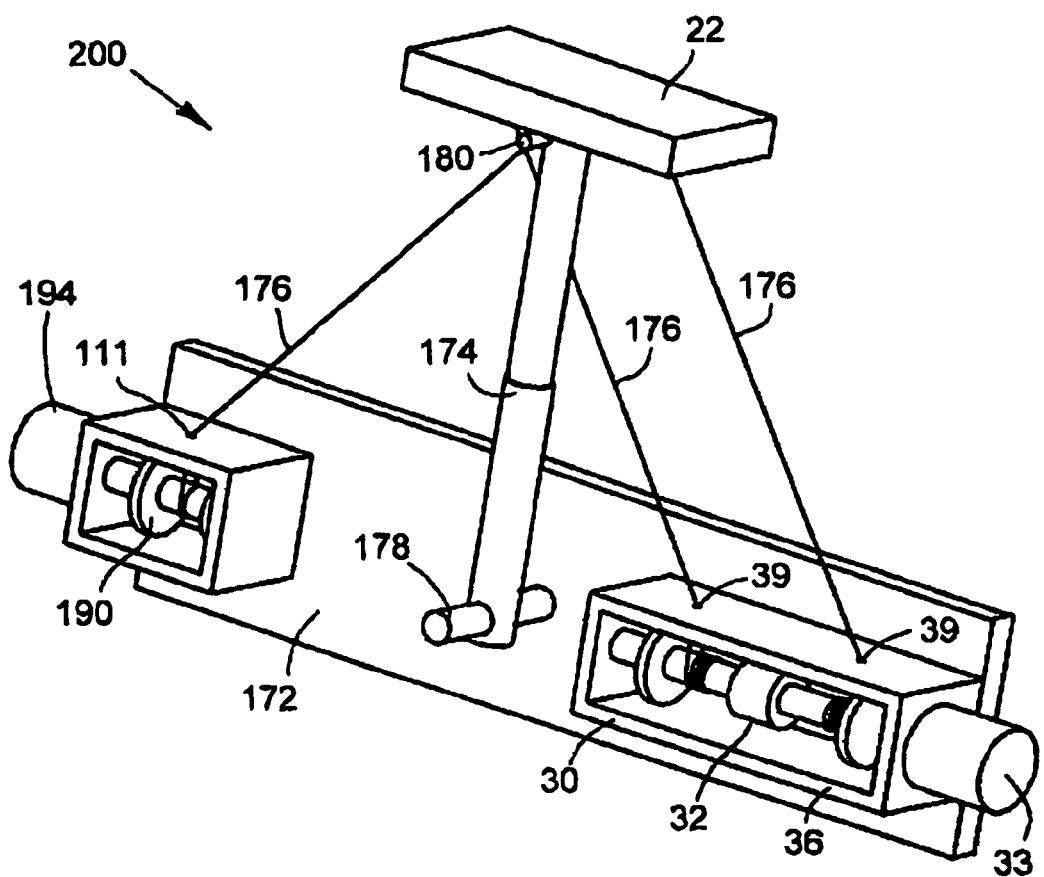
FIG. 19 is a perspective view of two degree of freedom parallel planar manipulator using an active cable.

In mechanism 170 of FIG. 17, the cables 176 from the side of post 174 having the two winches 188 side-by-side have the ability to constraint the orientation of the moving platform 22. If these cables are equal in length, the cables 176 and the moving platform 22 forms a parallelogram for the same reasoning as the apparatus shown in FIG. 1. Thus, the moving platform 22 will be parallel to the top plane 173 of the base plate 172. On the other hand, if cables 176 are different in length, the combination of all three cables determines the orientation of the moving platform 22. Therefore, referring to FIG. 19, a two translational degree of freedom active cable mechanism shown generally at 200 can be constructed by replacing the two adjacent winch assemblies 188 shown on FIG. 17 with a two cable winch assembly 30 shown in FIG. 1. Note that the resulting mechanism requires only two motors 194 and 33 only. In FIG. 19, a design with one drum and motor for the two cables on the same side of post 174 maintains the orientation of end effector 22 is fixed, which is parallel to the base 172 in FIG. 19. One of the two paired cables could be longer or shorter with respect to the other thereby inclining the end effector 22 and as long as the length ratio of the two cables remains fixed the orientation or angle of the end effector 22 will remain constant.

9. Three DOF Planar Parallel Mechanism Using Passive Cables

Figure 20:
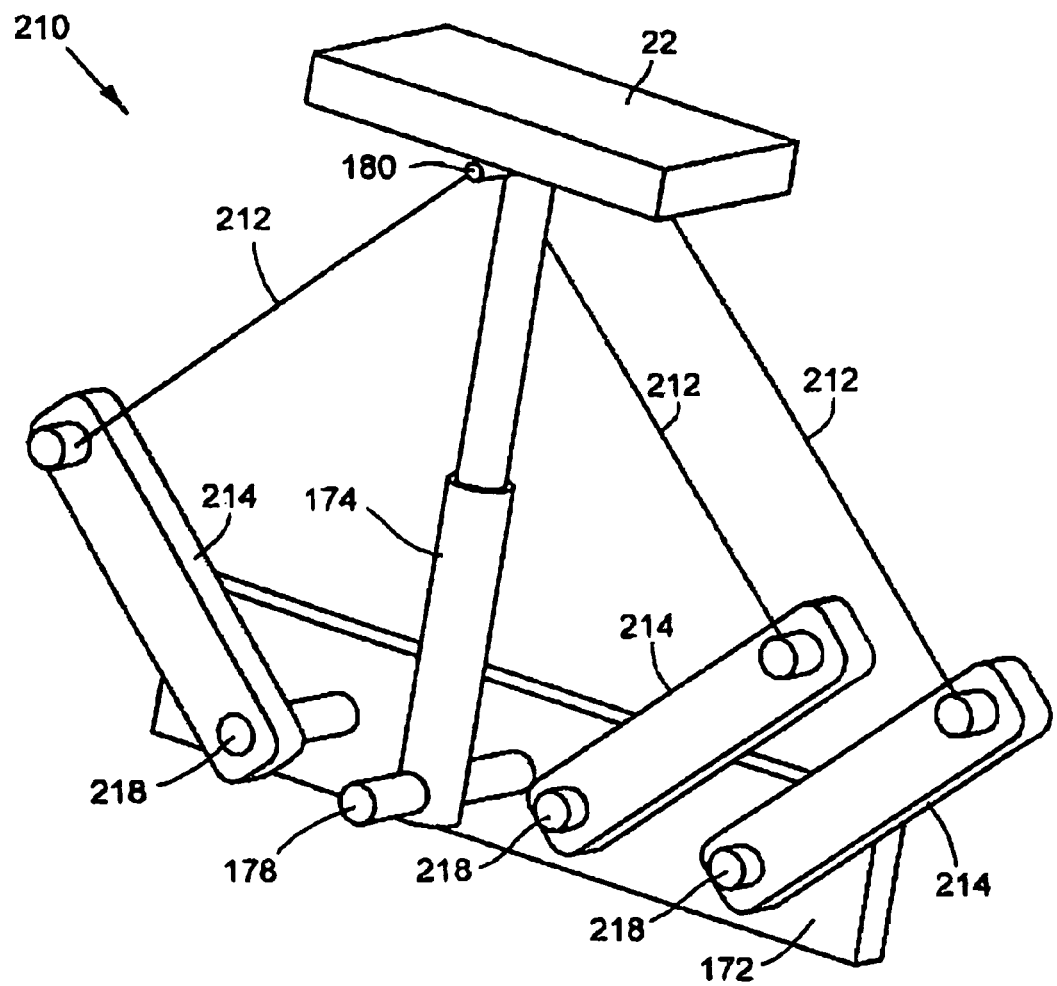
FIG. 20 is a perspective view of a parallel planar manipulator using a passive cable.

A general three degree of freedom planar parallel mechanism using passive cables in accordance with the present invention is shown generally at 210 in FIG. 20. The moving platform 22 is attached to the base plate 172 by extensible or telescoping central post 174 and three passive cables 212 each connected at one end of the cables to three link-arms 214 and the other ends connected to platform 22. The connections of the cables 212 and the central post 174 to moving platform 22 is identical to the connections in mechanism 170 shown in FIGS. 17, 18 and 19. The connection of post 174 to base 172 is also the same as in FIG. 17. Link-arms 214 are pivotally connected to base 172 through revolute joints 218. Similar to the active cable counterpart mechanism 170 in FIG. 17, passive cable mechanism 210 also requires a pair of the cables 212 on one side of the central post 174 and at least one cable 212 on the opposite side. The side with two cables 212 controls the orientation of the moving platform 22. If these cables were equal in length and are parallel to each other, the cables and the tips of the link-arms form two parallelograms. Therefore, the orientation of moving platform 22 will be fixed during movement of the end effector 22, and in the FIG. 20 it will be parallel to ground. On the other hand, if this pair of cables 212 is orientated differently, the combination of all three cables determines the orientation of the moving platform 22. It should be pointed out that the motion of ends of the cables 212 attached to arms 214 is not necessarily circular provided by arm 214, and it can be linear or any other complex trajectory generated by linkage mechanisms. This is analogous to the motion of pins 46 in the mechanism 60 illustrated in FIG. 3.

Figure 21:
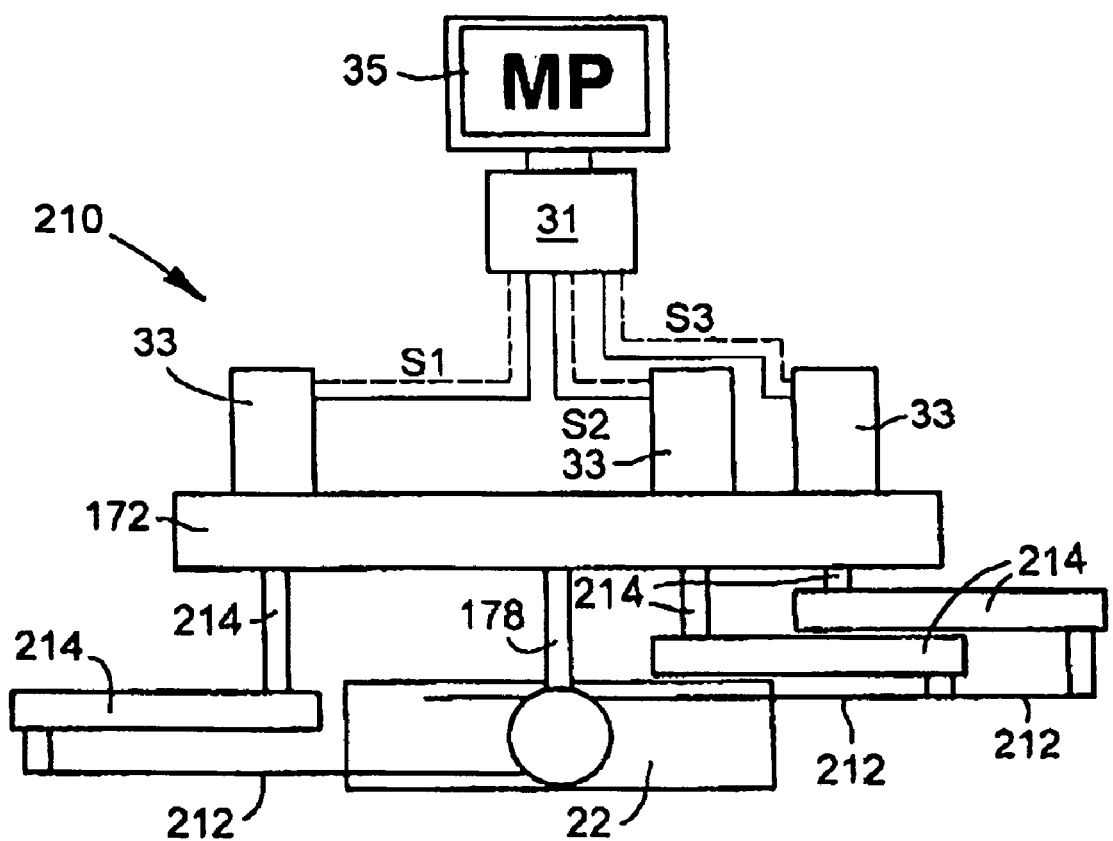
FIG. 21 is a bottom view of three degree of freedom parallel planar manipulator using a passive cable.

Referring to FIG. 21, a computer controlled motor controller system such as computer 35 connected to controller 31 shown in FIG. 1 is used to control the motor which drives the link arms 214. FIG. 21 shows a bottom view of the mechanism 210 with the motors 33 attached to the lower revolute joints 218 of the link-arms 214. The rigid link arms 214 are offset to maximize the rotation of link arms 214 without any interference with each other. Increasing the rotation of link arms 214 will minimize the size of the robot. This applies to the embodiments shown in FIGS. 17 to 24. The orientation of the cables 212 is determined by the amount of rotation on the link-arms 214. Coupled with the passive cables 212, the position and the orientation of the moving platform 22 are controlled. The operating principal is similar to the mechanism illustrated in FIG. 2.

9. Two DOF Planar Parallel Mechanism Using Passive Cables

Figure 22:
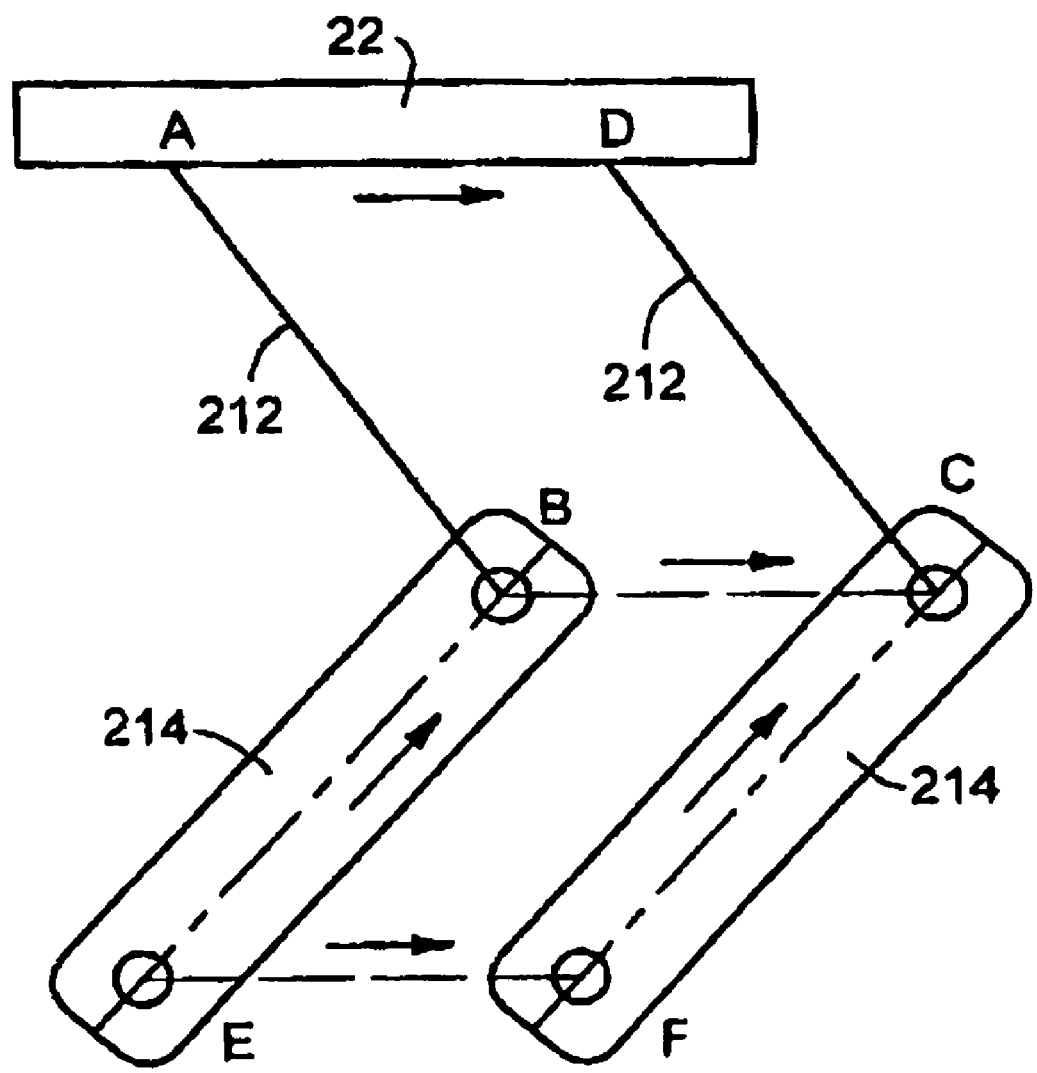
FIG. 22 shows the parallelism of the moving platform enforced by two parallelograms.

The mechanism shown in FIG. 20 can be converted to a two degree of freedom planar manipulator by synchronizing the motion of the paired link-arms. A timing belt (or equivalently a chain-sprocket drive) can be used for that purpose. The configuration can be made by attaching a sheave to the revolute joint 218 and rigidly attach them to the link arm 214. The synchronizing motion can be achieve by connecting the sheave with a timing belt. A synchronized motion of the paired link-arms 214 ensures the parallelism of the paired cables 212 that in turn restricts orientation of the moving platform 22. As illustrated in FIG. 22, when two link-arms 214 are parallel, the close loops B-C-E-F and A-D-B-C form two parallelograms, which forces line A-D (attached to the moving platform) to be parallel with line E-F (attached to the base plate). Hence, the rotating degree of freedom of the moving platform is eliminated, leaving two translational degrees of freedom to the mechanism only.

Figure 23:
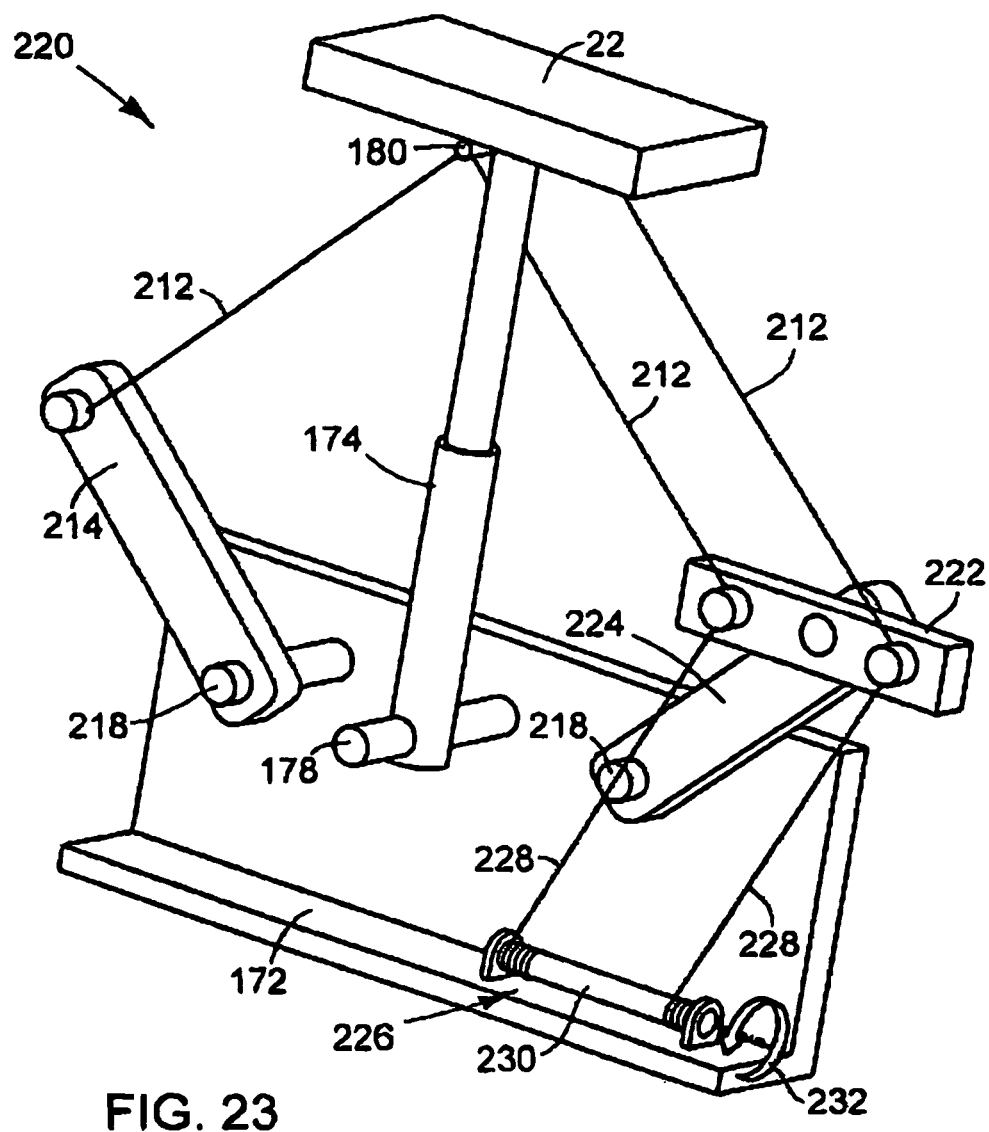
FIG. 23 is a perspective view of a two degree of freedom parallel planar manipulator driven by passive cables with the orientation constrained by a winch mechanism.

10. Hybrid Two DOF Planar Parallel Mechanism Using Passive Cables for Positioning and Active Cable for Orientation FIG. 23 shows another alternative embodiment of a mechanism shown at 220 to achieve the parallelism of the moving platform 22. In mechanism 220, the cables 212 that are attached to the moving platform 22 are connected to a beam 222, which pivots about the free end of a link-arm 224. The orientation of the beam 222 is constrained using a winch assembly 226 that includes a pair of cables 228 attached to beam 222, a drum 230, and a torsion spring (represented by a torsion load 232). Since both cables 228 are connected to the same drum 230, their lengths are always equal to each other. The torsion spring 232 is attached to the drum 230 to maintain tension in cables 228. Note that drum 230 is passive and its rotation depends on the orientation of arm 224 orientation. Analogous to the configuration shown in FIG. 22, the drum 230, the beam 222, the pairs of cables 228 and 212, and the moving platform 22 form two parallelograms that ensure the parallelism between the moving platform 22 and the base plate 172. Hence, the orientation of the moving platform 22 is maintained parallel to the ground.

Figure 24:
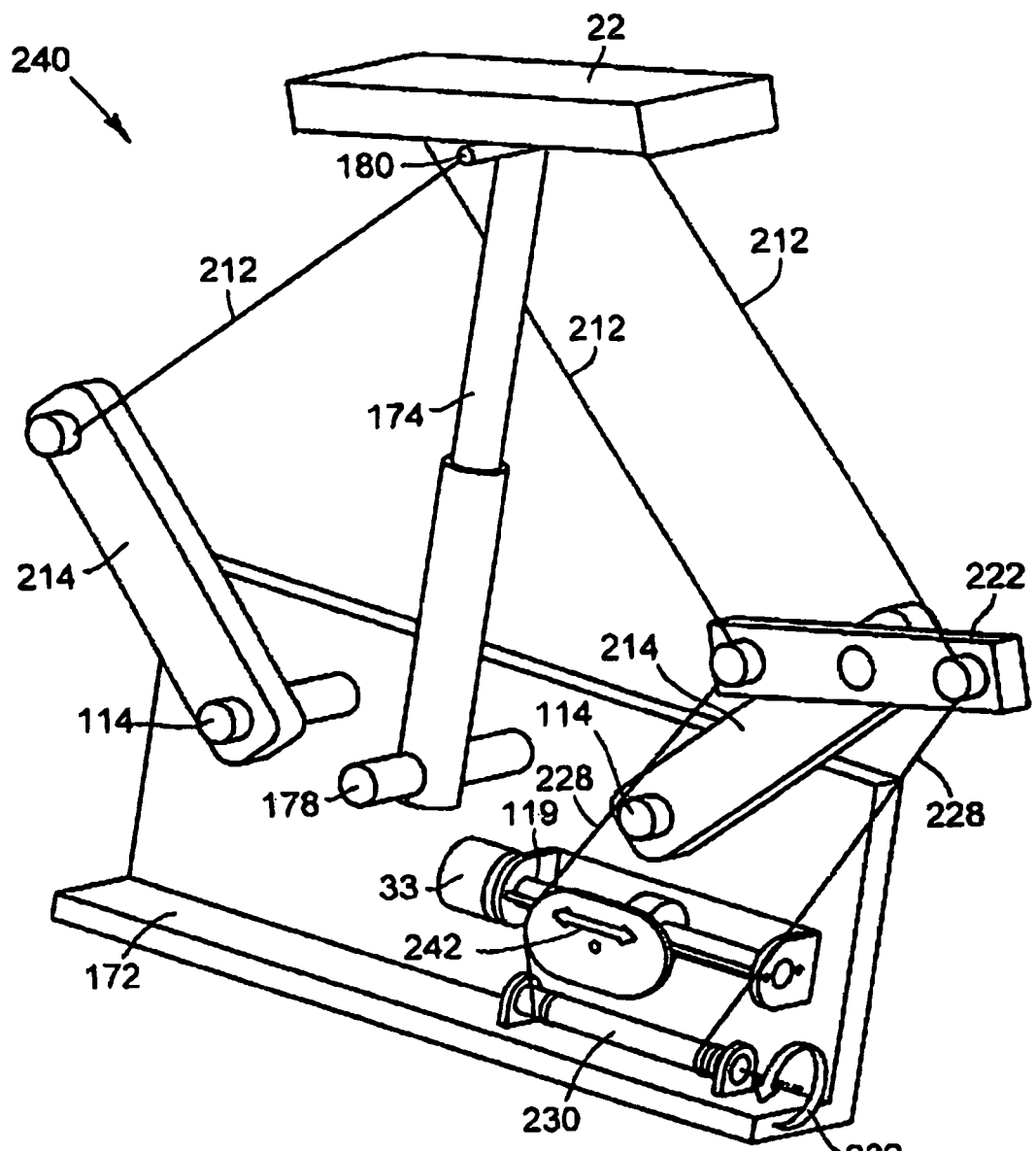
FIG. 24 shows a perspective view of a three degree of freedom parallel planar manipulator driven by passive cables with the orientation controlled by a cam and a winch mechanism.

11. Hybrid Three DOF Planar Parallel Mechanism Using Passive Cables For Positioning And Active Cable For Orientation Referring now to FIG. 24, another embodiment of the mechanism shown in FIG. 20 is shown at 240. Mechanism 240 is similar to mechanism 220 of FIG. 23 but includes a cam 242 that routes one of the cables 228. The objective of cam 242 is to create a bias on the length of one of the active cables 228 to provide a new degree of freedom to the robot mechanism of FIG. 23. Adjusting the bias in the cable will allow to control the orientation of the moving platform 22. The operating principal is similar to a cam-follower mechanism. The linear guide 119 is used to induce a linear motion to cam 242 as shown in FIG. 24.

When the cam 242 moves towards the center of the mechanism, it routes the inner active cable 228 around the cam face. This effectively shortened the length the routed active cable while leaving the other active cable untouched. The resulting effect is a distortion on the parallelogram formed by the active cables and the beam. The routed cable pulls the beam on one side and forces the beam to tilt towards the routed cable. As a result, the beam 222 will no longer be parallel to ground, but is controlled by this cam 242. Since the moving platform is parallel to the beam, the orientation of the moving platform is also controlled. The same operation can be performed on the other cable 228. When the cam 242 moves towards the edge of the robots, it pulls the beam 222 on one side and forces the beam 222 to tilt towards the edge of the robot, which leads to the same rotation on the moving platform 22.

As used herein, the terms "comprises", "comprising", "including" and "includes" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A robotic mechanism, comprising:
a support base, an end effector and a biasing member having opposed ends and attached at one of said opposed ends to the support base and attached at the other of said opposed ends to the end effector; and
at least three cables each connected at a first end thereof to said end effector and said at least three cables having second ends being attached to an associated positioning mechanism for moving the second ends of said at least three cables to position said end effector in a selected position in space, a length of each of said at least three cables between said end effector and said associated positioning mechanism being fixed, said biasing member applying force on the end effector with respect to the support base for maintaining tension in said at least three cables.

2. The robotic mechanism according to claim 1 including a computer controller connected to each said positioning mechanism for synchronizing the movement of each positioning mechanism with respect to the other positioning mechanisms to control movement of said end effector.

3. The robotic mechanism according to claim 1 wherein said at least three cables are three pairs of cables with the first ends of each pair of cables attached to the end effector and the second ends of each pair of cables being attached to said associated positioning mechanism, wherein each positioning mechanism includes an actuator for moving the second ends of the associated pair of cables independently of the other pairs of cables, each pair of cables having the first ends of the pair of cables attached to the end effector and the second ends of the pair of cables being attached to its associated actuator in such a way that two cables of each pair of cables are parallel to each other and define a parallelogram so that the robotic mechanism has three degrees of freedom so that during movement of the end effector the orientation of the end effector remains fixed so that the robotic mechanism has three degrees of freedom.

4. The robotic mechanism according to claim 1 wherein said biasing member is a spring.

5. The robotic mechanism according to claim 1 wherein said biasing member is selected from a group of powered cylinders consisting of hydraulically, pneumatically, and electrically powered cylinders having an adjustable length.

6. The robotic mechanism according to claim 1 wherein said biasing member is pivotally attached to said end effector and said support base using universal joints.

7. The robotic mechanism according to claim 1 said end effector includes a mounting mechanism for receiving a tool to be mounted on the end effector.

* * * * *